United States Patent
Ryoo et al.

(10) Patent No.: US 11,570,696 B2
(45) Date of Patent: Jan. 31, 2023

(54) METHOD AND DEVICE FOR USING RESOURCES IN WIRELESS MOBILE COMMUNICATION SYSTEM

(71) Applicant: Samsung Electronics Co., Ltd., Suwon-si (KR)

(72) Inventors: Sunheui Ryoo, Yongin-si (KR); Jiwon Hwang, Suwon-si (KR); Jungsoo Jung, Seongnam-si (KR); Rayeon Ahn, Seoul (KR); Sungjin Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/301,417

(22) PCT Filed: May 12, 2017

(86) PCT No.: PCT/KR2017/004933
§ 371 (c)(1),
(2) Date: Nov. 13, 2018

(87) PCT Pub. No.: WO2017/196119
PCT Pub. Date: Nov. 16, 2017

(65) Prior Publication Data
US 2019/0289534 A1    Sep. 19, 2019

(30) Foreign Application Priority Data

May 13, 2016    (KR) .................. 10-2016-0059117
May 25, 2016    (KR) .................. 10-2016-0064258

(51) Int. Cl.
*H04W 48/16*    (2009.01)
*H04W 48/00*    (2009.01)
(Continued)

(52) U.S. Cl.
CPC .......... *H04W 48/16* (2013.01); *H04W 48/17* (2013.01); *H04W 72/0446* (2013.01);
(Continued)

(58) Field of Classification Search
CPC ..... H04W 48/16; H04W 76/28; H04W 76/27; H04W 48/17; H04W 72/0446;
(Continued)

(56) References Cited

U.S. PATENT DOCUMENTS

| 7,212,809 | B2 | 5/2007 | Khawand | |
| 2013/0058315 | A1* | 3/2013 | Feuersanger | H04W 74/004 370/336 |

(Continued)

FOREIGN PATENT DOCUMENTS

| WO | WO-2014082215 A1 * | 6/2014 | ............. H04L 5/001 |
| WO | 2015127833 A1 | 9/2015 | |

OTHER PUBLICATIONS

ISA/KR, International Search Report and Written Opinion of the International Searching Authority for International Application No. PCT/KR2017/004933, dated Aug. 23, 2017, 10 pages.
(Continued)

*Primary Examiner* — Kwang B Yao
*Assistant Examiner* — Xuan Lu

(57) ABSTRACT

The present invention relates to a 5G or pre-5G communication system for supporting higher data transmission rate compared to a beyond 4G communication system such as LTE. A method for using resources by an electronic device in a wireless mobile communication system can comprise the steps of: setting dedicated wireless access configuration for each service; detecting a first service request; and, on the basis of the setting, transmitting and receiving a signal using a dedicated wireless access configuration corresponding to
(Continued)

the first service. The present invention is not limited to the embodiment and can pertain to other embodiments.

12 Claims, 27 Drawing Sheets

(51) Int. Cl.

| | |
|---|---|
| H04W 72/04 | (2009.01) |
| H04W 76/27 | (2018.01) |
| H04W 76/28 | (2018.01) |
| H04W 80/02 | (2009.01) |
| H04W 80/08 | (2009.01) |
| H04W 88/12 | (2009.01) |
| H04W 48/18 | (2009.01) |
| H04W 48/12 | (2009.01) |
| H04W 4/70 | (2018.01) |
| H04W 28/24 | (2009.01) |
| H04W 68/00 | (2009.01) |

(52) U.S. Cl.
CPC ... *H04W 72/0453* (2013.01); *H04W 72/0493* (2013.01); *H04W 76/27* (2018.02); *H04W 76/28* (2018.02); *H04W 80/02* (2013.01); *H04W 80/08* (2013.01); *H04W 88/12* (2013.01); *Y02D 30/70* (2020.08)

(58) Field of Classification Search
CPC ......... H04W 72/0453; H04W 72/0493; H04W 80/02; H04W 80/08; H04W 88/12; Y02D 30/70
USPC .......................................................... 370/329
See application file for complete search history.

(56) References Cited

U.S. PATENT DOCUMENTS

| | | | |
|---|---|---|---|
| 2013/0072252 A1 | 3/2013 | Chen et al. | |
| 2014/0241302 A1* | 8/2014 | Korhonen | H04W 72/1278 370/329 |
| 2016/0156635 A1 | 6/2016 | Liu et al. | |
| 2017/0070892 A1* | 3/2017 | Song | H04L 41/042 |
| 2017/0141833 A1* | 5/2017 | Kim | H04L 5/0057 |
| 2017/0181149 A1* | 6/2017 | Ang | H04L 5/0094 |
| 2017/0311245 A1* | 10/2017 | Kuge | H04W 48/18 |
| 2017/0374613 A1* | 12/2017 | Ian | H04W 40/04 |
| 2018/0146465 A1* | 5/2018 | Li | H04W 72/04 |
| 2018/0199277 A1* | 7/2018 | Ke | H04W 76/12 |
| 2018/0220465 A1* | 8/2018 | Zhang | H04L 5/0053 |
| 2019/0013982 A1* | 1/2019 | Sun | H04L 1/1854 |
| 2019/0068355 A1* | 2/2019 | Ode | H04L 5/14 |
| 2020/0305094 A1* | 9/2020 | Ouchi | H04L 5/0055 |

OTHER PUBLICATIONS

Balazs Bertenyi et al., "Summary of "[5G-AH-05] RAN-Core connectivity, Virtualization & Network Slicing" email discussion," RP-160251, 3GPP TSG RAN #71, Gothenburg, Sweden, Mar. 7-10, 2016, 5 pages.

Qian (Clara) Li, et al., "End-to-end Network Slicing in 5G Wireless Communication Systems," ETSI Workshop on Future Radio Technologies—Air Interfaces, Sophia Antipolis, France, Jan. 27-28, 2016, 6 pages.

3GPP TR 23.799 V0.4.0 (Apr. 2016), Technical Report, 3rd Generation Partnership Project; Technical Specification Group Services and System Aspects; Study on Architecture for Next Generation System (Release 14), 93 pages.

* cited by examiner

METHOD AND DEVICE FOR USING RESOURCES IN WIRELESS MOBILE COMMUNICATION SYSTEM

CROSS-REFERENCE TO RELATED APPLICATIONS

This application is a 371 National Stage of International Application No. PCT/KR2017/004933, filed May 12, 2017, which claims priority to Korean Patent Application No. KR 10-2016-0059117, filed on May 13, 2016 and Korean Patent Application No. KR 10-2016-0064258, filed on May 25, 2016, the disclosures of which are herein incorporated by reference in their entirety.

BACKGROUND

1. Field

The disclosure relates to wireless resource use in a wireless mobile communication system.

2. Description of Related Art

Efforts are underway to develop an improved 5G or pre-5G communication system to meet growing demands for wireless data traffic after commercialization of a 4G communication system. For this reason, the 5G communication system or the pre-5G communication system is called a communication system after a 4G network (beyond 4G network) or after an LTE system (post LTE).

To achieve a high data rate, the 5G communication system is being considered for implementation in very high frequency (mmWave) bands (e.g., 60 GHz bands). In order to mitigate the path loss of radio waves in the very high frequency band and to increase the propagation distance of radio waves, in the 5G communication system, beamforming, massive MIMO, full-dimensional MIMO (FD-MIMO), array antennas, analog beam-forming, and large scale antenna technologies are being discussed.

Meanwhile, a wireless protocol of the LTE system includes packet data convergence protocol (hereinafter, referred to as PDCP) layers, radio link control (hereinafter, referred to as RLC) layers, and medium access control (hereinafter, referred to as MAC) layers in each of a UE and an eNB.

The PDCP layers perform operations such as Internet protocol (hereinafter, referred to as IP) header compression/decompression, and the RLC layers perform an automatic repeat request (hereinafter, referred to as ARQ) operation by reconstructing a PDCP packet data unit (hereinafter, referred to as PDU) to have an appropriate size.

The MAC layers are connected to a plurality of RLC layer devices included in a UE, and perform an operation of multiplexing the RLC PDUs into MAC PDUs and demultiplexing the MAC PDUs to generate RLC PDUs. Physical layers perform an operation of channel-coding and modulating upper layer data, generating the channel-coded and modulated upper layer data as an OFDM symbol, and transmitting the generated OFDM symbol through a wireless channel. Alternatively, the physical layers perform an operation of demodulating the OFDM symbol received through the wireless channel and channel-decoding the demodulated OFDM symbol to transmit the channel-decoded OFDM symbol to an upper layer.

In an existing LTE system, all services use the same configuration across wireless resources. An example is shown below.

Default bearer is set and then dedicated bearer is set
Default bearer is BE; each bearer has one IP address (always-on IP connectivity)
All flows are mapped to one radio bearer (RB)
MAC/RLC/PDCP is set per bearer
Each signaling radio bearer (SRB) and data radio bearer (DRB)

The service may include applications having different QoS requirements (and sets thereof), such as BE, eMBB, URLLC, mMTC, VoIP, etc., and may include latency, energy efficiency, power consumption, battery life, data rate, and a set of requirements that are considered important in other mobile communications.

SUMMARY

A conventional LTE is designed for high-speed and high-mobility so that it may not be suitable for supporting new services and requirements (e.g., delay-tolerant, small data transmission for machine-type communication, MTC).

Therefore, in a 5G QoS framework, it is necessary to design a radio access network (RAN) optimized per-service for connection between a UE and an eNB through a radio interface.

In accordance with an aspect of the disclosure, there is provided a method of using resources of an electronic device in a wireless mobile communication system, the method including: setting a dedicated wireless access configuration for each service; detecting a first service request; and, on the basis of the setting, transmitting and receiving a signal using the dedicated wireless access configuration corresponding to the first service.

In accordance with another aspect of the disclosure, there is provided an electronic device in a wireless mobile communication system, the electronic device including: a transceiver configured to transmit and receive a signal; and a controller configured to set a dedicated wireless access configuration for each service, to detect a first service request, and, on the basis of the setting, to transmit and receive a signal using the dedicated wireless access configuration corresponding to the first service.

According to the disclosure, signaling overhead optimization and UE power consumption efficiency can be achieved by controlling an idle operation of a UE based on services and/or requirements.

DETAILED DESCRIPTION

Figure 1:
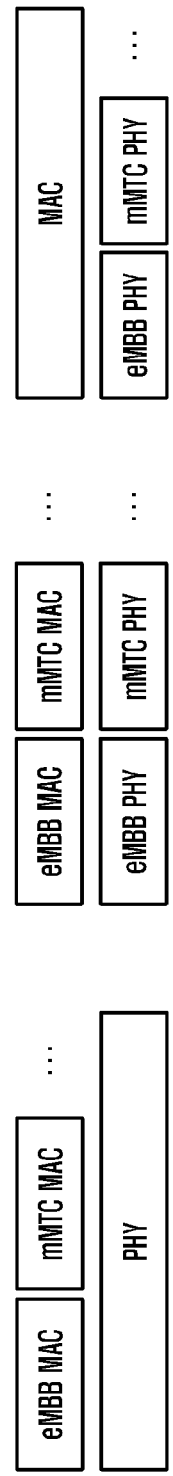
FIG. 1 is a diagram illustrating a RAN hierarchy option according to an embodiment of the disclosure.

Hereinafter, various embodiments of the present disclosure will be described more fully in conjunction with the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit various embodiments of the present disclosure to the particular embodiments disclosed herein, but the present disclosure should be construed to cover all modifications, equivalents, and/or alternatives falling within the spirit and scope of the various embodiments of the present disclosure. In connection with descriptions of the drawings, like reference numerals designate like elements.

As used in various embodiments of the present disclosure, the expressions "include", "may include", and other conjugates refer to the existence of a corresponding disclosed function, operation, or constituent element, and do not limit one or more additional functions, operations, or constituent elements. Further, as used in various embodiments of the present disclosure, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

Further, as used in various embodiments of the present disclosure, the expression "or" includes any or all combinations of words enumerated together. For example, the expression "A or B" may include A, may include B, or may include both A and B.

While expressions including ordinal numbers, such as "first" and "second", as used in various embodiments of the present disclosure may modify various constituent elements, such constituent elements are not limited by the above expressions. For example, the above expressions do not limit the sequence and/or importance of the corresponding constituent elements. The above-described expressions may be used to distinguish an element from another element. For example, a first user device and a second user device indicate different user devices although both of them are user devices. For example, a first element may be termed a second element, and likewise a second element may also be termed a first element without departing from the scope of various embodiments of the present disclosure.

It should be noted that if it is described that an element is "coupled" or "connected" to another element, the first element may be directly coupled or connected to the second element, and a third element may be "coupled" or "connected" between the first and second elements. Conversely, when one component element is "directly coupled" or "directly connected" to another component element, it may be construed that a third component element does not exist between the first component element and the second component element.

The terms as used in various embodiments of the present disclosure are merely for the purpose of describing particular embodiments and are not intended to limit the various embodiments of the present disclosure. As used herein, the singular forms are intended to include the plural forms as well, unless the context clearly indicates otherwise.

Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

Various embodiments of the disclosure relate to a RAN slice, partition, or configuration. A subject constituting the RAN slice may be an eNB, a network, or a UE. According to various embodiments, various definitions of RAN slices may be enabled in each protocol layer (MAC, RLC, PDCP, and RRC) within a radio interface protocol of wireless communication including LTE system and new radio access technology. For example, a common slice that can be used by all services and UEs or a dedicated slice that can be used only by a specific service or a UE may be set.

In addition, various embodiments of the disclosure relate to an operation in which a UE applies, sets, and operates the RAN slice.

For example, examples of a slice utilization operation in an idle state of a UE and an operation in which a UE in an idle state wakes up in a system having a RAN sliced structure to receive a broadcast signal (cell search/synchronization (PSS/SSS), SI acquisition, or the like) and to apply the same to on-demand mobility will be described.

In addition, examples of a slice operation of a connected UE and power efficiency enhancement and service information-based slice configuration will be described. For example, it is possible to improve the efficiency of a connected DRX operation by adjusting an inactivity timer based on services/requirements of transmission/reception data.

FIG. 1 is a diagram illustrating a RAN hierarchy option according to an embodiment of the disclosure.

Referring to FIG. 1, a RAN slice, partition, or configuration will now be described with reference to FIG. 1.

According to an embodiment of the disclosure, the RAN slice may be configured with a set of one or more of different functions corresponding to MAC, RLC, PDCP, and RRC of a conventional LTE system, parameters and control signaling which are set to control operations related to each function, and physical time and frequency resources for exchanging user data.

The function and operation of each layer of a protocol (corresponding to PDCP, RLC, MAC, PHY, etc., according to the LTE standard) can be dynamically set by an RRC layer in a control plane, or can be set by each of other layers (layer corresponding to PDCP, RLC, MAC, PHY, etc.) transmitting information or a signal. In addition, the function and operation thereof may be statically set by necessity such as other requirements per-service.

For example, a first option may be a device-specific RRC, and the RRC may set the function and operation of a lower layer.

A second option may be a plurality of RRC layers/entities/functions in the device, and each of which is responsible for controlling a radio resource connection of one service (each of which corresponds to 'slice' constituted of lower layer configurations).

The following definitions can be used in each layer (PHY, MAC, etc.) of the RAN slice (or partition/configuration) protocol.

The physical layer slices are different time-frequency resources defined per-service, and each physical layer slice can be transmitted and received through a separate physical layer channel mapped to different respective numerologies having different numerologies.

The physical (PHY) layer slice according to an embodiment of the disclosure can be variously defined as follows.

a) Defined in Per-Service Resource Block.

Figure 2A:
FIGS. 2A to 2D are drawings illustrating various examples of a physical layer structure according to an embodiment of the disclosure.

For example, referring to FIG. 2A, the entire range of a frequency spectrum belonging to a licensed owner may be divided into different blocks having different bandwidths depending on necessity or request, depending on the type of service or arrangement.

b) Defined in Resource Allocation Per-Service within a Frequency Domain in a System Bandwidth Range.

Figure 2B:
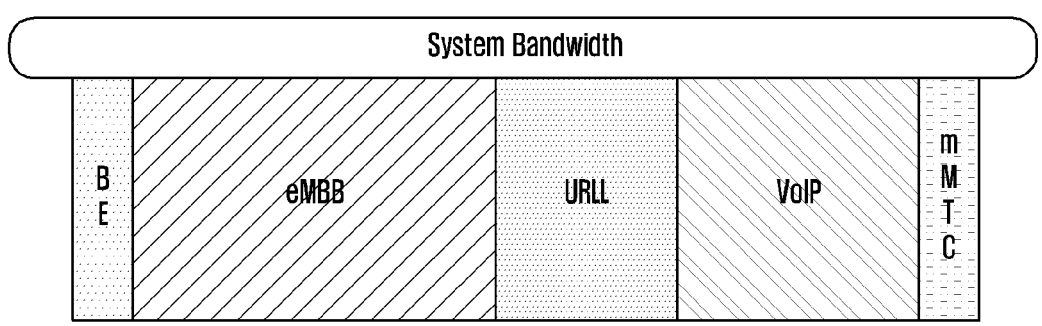

For example, referring to FIG. 2B, the PHY layer slice may be static resource allocation and each slice may separately have a shared/single numerology or a service-specific numerology (e.g., subcarrier spacing, bandwidth, etc.).

c) Defined in Physical Channel Configuration Per-Service in a Time Domain.

Figure 2C:
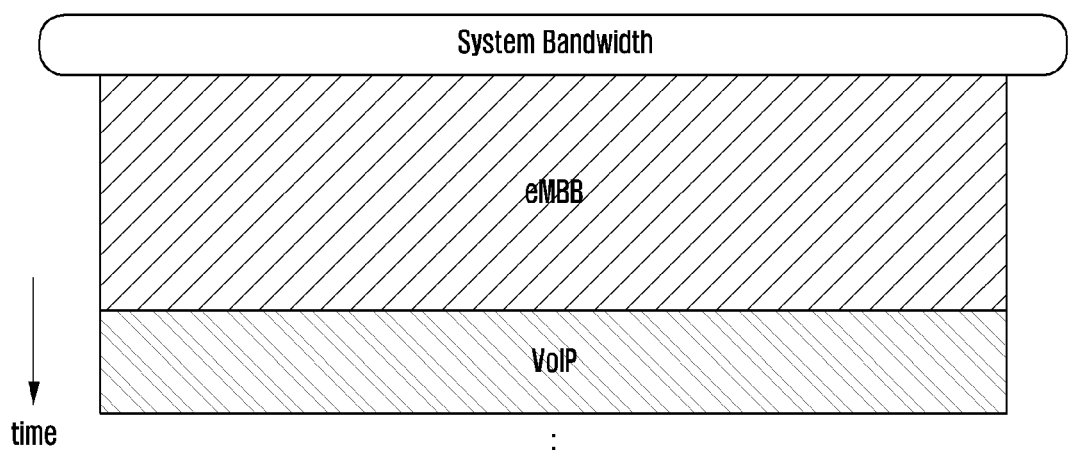

For example, referring to FIG. 2C, the PHY layer slice may be dynamic resource allocation in a time domain, and the physical channel configuration may be fixed in time or dynamically changed per-service.

For example, the PHY layer slice may be time-frequency resources having a shared/single numerology or different numerologies per-service (subcarrier spacing, bandwidth, etc.).

By way of another example, the PHY layer slice may operate as resources of each of time-frequency-space-code-beams having a shared numerology or different numerologies (subcarrier spacing, bandwidth, etc.) per-service or a set thereof.

By way of another example, the PHY layer slice may operate as resources of each of time-frequency-space-code-beams having a single numerology or different respective numerologies (subcarrier spacing, bandwidth, etc.) per-service or a set thereof.

d) Defined as Dynamic/Puncturing/Overlapped Resource Allocation.

For example, the PHY layer slice may be time-frequency resources having a shared/single numerology or different numerologies per-service (subcarrier spacing, bandwidth, etc.).

By way of another example, the PHY layer slice may operate as resources of each of time-frequency-space-code-beams having a shared numerology or different respective numerologies (subcarrier spacing, bandwidth, etc.) per-service or a set thereof.

By way of another example, the PHY layer slice may operate as resources of each of time-frequency-space-code-beams having a single numerology or different respective numerologies (subcarrier spacing, bandwidth, etc.) per-service or a set thereof.

The PHY layer slice can be defined as a signal transmitted/received on physical resources and physical resource configuration of a channel corresponding to the signal.

For example, the PHY layer slice can be defined as a PSCH/SSCH, PBCH, SIB, control channel (PDCCH) resource, paging, RACH, or RRC signaling transmission resource configuration. For example, each signal can use a fixed location on a time/frequency space, or the transmission location of each signal can be set per-service. Regarding the configuration, an eNB transmits and synchronizes PHY channel (sub-frame, frame, slot, or symbol) configuration information and then a UE receives the configuration information to enable PHY channel resource configuration and use. The PHY layer channel configuration information can be transmitted and received in a predetermined time-frequency resource.

Figure 2D:
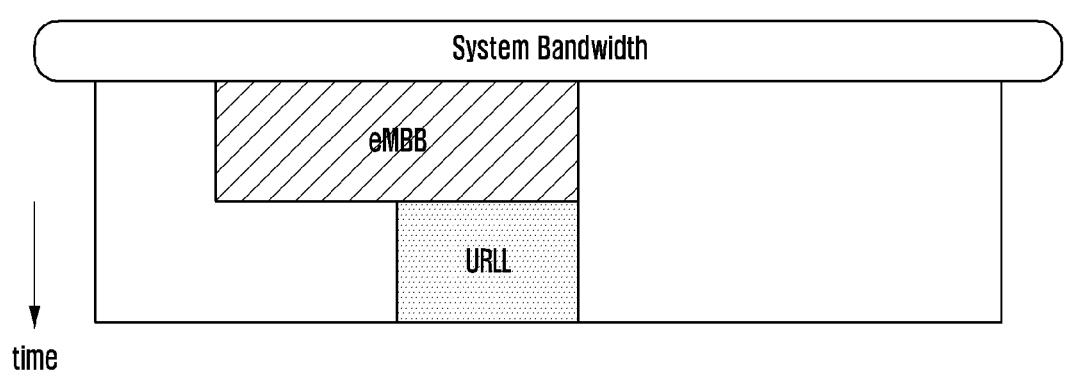

For example, referring to FIG. 2D, different respective numerologies per-service (subcarrier spacing, bandwidth, etc.) may be set and operate.

An MAC layer slice according to an embodiment of the disclosure can be variously defined as follows.

Defined by a set of various functions (e.g., whether to perform HARQ/operation, whether to perform a random access operation, etc.) performed by an MAC.

Defined by a set of parameters set within the respective functions and a set of the corresponding operations.

For example, the MAC layer slice may be defined by some or all of the functions performed by the MAC, including examples described below.

1) Regarding HARQ, the number of processes (e.g., set to use a small number of processes in the case of mMTC), the number of retransmissions, feedback (ACK/NACK) information, feedback timing, etc., can be set, 2) (De)multiplexing and (dis)assembly can be set (in the conventional LTE, an RRC controls scheduling of each logical channel, and a method of transmitting priority information within logical channel configuration information element (IE) and information about a prioritized bit rate to a UE by RRC signaling is used), 3) From idle or while connected (contention-free) can be set in a random access, 4) DRX cycle length/period, amount of 'on duration', length of DRX inactivity timer, etc., can be considered in a DRX.

For example, the MAC layer slice can be defined by some or all of the functions performed in the RRC layer, including examples described below.

1) Mobility control configuration of an idle UE (parameters used for controlling cell signal strength measurement period and cell selection), 2) mobility control configuration of a connected UE (parameters used for controlling cell signal strength measurement period and cell selection), and 3) parameters used to control transmission of broadcast information (cell-related system information, master information block) can be considered.

Meanwhile, the RAN slice or the PHY/MAC slice may be a common slice or a dedicated slice.

The PHY slice can operate as a common slice or a shared slice or a dedicated slice, as allocation of each of time/frequency/code/beam/spatial resources which are isolated and divided radio resources.

In addition, the PHY slice can operate as a common slice or a shared slice, or a dedicated slice, as an isolated and divided access channel.

The MAC slice can operate as a common slice or shared slice, or a dedicated slice, as isolated and divided RAN resource configuration.

A common or shared slice can be used by all devices of all service types. The common slice can have a static or a dynamic configuration.

For example, the common slice can be defined as 1) a configuration value that sets a detailed operation of a MAC function or a specific MAC function applied if there is no RRC connection between a UE and an eNB (IDLE), or 2) configuration of the PHY layer such as minimum bandwidth Bmin allocated to transmit and receive corresponding information, a fixed MCS value, coding scheme, etc., parameter, time, frequency, spatial resources, and a set of PHY layer channels and functions transmitted and received by the corresponding resources. The UE may transmit and receive signals transmitted and received in a PHY layer slice corresponding to the common MAC slice, using the common MAC slice. The PHY layer slice may include specific frequency/time resources used for exchanging information in an idle state. Such a common access control layer slice can be commonly applied to all UEs.

The common slice may include a common slice in a PDCP, RLC, MAC, or PHY layer applied to a message transmitted as a set of PDCP/RLC/MAC/PHY configuration applied to a signaling radio bearer (SRB) message transmitted on a control plane, that is, transmitted as signaling information, after the RRC connection between a UE and an eNB is established (CONNECTED).

The common slice may include some or all of PDCCH, PBCH, PHICH, PCFICH, PUCCH, and PRACH areas.

A dedicated or per service slice can be used to mean a slice that is used for a specific UE or service or for a specific purpose.

For example, a service dedicated slice may be configuration of a radio interface protocol (PHY, MAC, RLC, PDCP, RRC layers) including the following example or configuration of a UE or eNB operation using a radio interface protocol.

Example of UE Operation Configuration
Adjust time, power, and period, consumed by a UE for signal transmission and reception, per-service
Example of UE or eNB Configuration
Frequency/time resources of PHY layer set per-service, PHY layer channels and functions transmitted and received by and corresponding resources
Example: PDCCH transmission/reception period configuration per-service
Detailed operation configuration of MAC function or specific MAC function set per-service
TTI length configuration per-service
Transport block size (TBS) configuration per-service
Detailed operation configuration of RRC function or specific RRC function set per-service
Mobility-related configuration per-service
Transmit broadcast information having different contents per-service at different periods
Example: Divide content of information transmitted through BCCH logical channel, per-service
MIB-eMBB, MIB-URLLC, MIB-mMTC, etc.
SIBx-eMBB, SIBx-URLLC, SIBx-mMTC, etc., (x=1, 2, . . . )
Set broadcast information transmission period and update period per-service
Set system parameter (TTI length, timing alignment, system bandwidth, priority per-service, etc.) for coexistence operation per-service (bearer, UE capability)
Different non-licensed bandwidth transmission and reception operations per-service (bearer, UE capability, packet traffic class). For example, set parameters (contention window size, backoff value range, energy/ preamble detection threshold, sensing bandwidth, transmission power, etc.) for listen-before-talk (LBT) operation in a PHY layer or LBT protocol type (frame-based equipment (FBE)-CAT2, load-based equipment (LBE)-CAT4, etc.), and a set, suite, or package of the parameters or/and LBT protocol.

Set different transmission methods of various control signals and data signals in a PHY layer per-service (bearer, UE capability, packet traffic class), a set of the transmission methods, or a codebook or a table for the set of the transmission methods.

Set different transmission methods for each of downlink (DL), uplink (UL), and sidelink (SL) in a PHY layer per-service (bearer, UE capability, packet traffic class), a set of the transmission methods, or a codebook or table for the set of the transmission methods.

According to various embodiments of the disclosure, a method of setting a RAN slice (common slice and dedicated slice) may include the following example.

The common slice and the dedicated slice may be defined/set in advance in standardization or another method (static configuration case). The dedicated slice may be dynamically defined/set according to the needs of a UE or an eNB (dynamic configuration case).

If information that needs to be transmitted/received through uplink communication is generated, a method for a UE to determine a service type desired to be provided through the information may include the following method.
    UE performs and determines packet inspection on packet data If information that needs to be transmitted/received through downlink communication is generated, a method for a UE/eNB to determine a service type desired to be provided through the information may include the following method.
    Receive service and information about requirements according to the service from a network or eNB
    Example: some or all of control information or user data transmitted by a network or eNB A method for a UE or eNB to acquire and use information about a slice set in the above manner may include the following method.
    <Case of Statically Setting Slice>
    Store information about all slices in a UE or eNB in advance, and select and use appropriate slice as necessary.
    Example: a manufacturer, seller, or carrier of a UE may store information about one or more slices in a UE and eNB in advance.
    Store all kinds of slice information in an eNB by a communication provider, a network equipment provider, or the like, and transmit the stored information to a UE: an example of the transmission method may include an information transmission/reception method of all RRC, PDCP, RLC, MAC, and PHY layers including the following method.
    If a UE searches for and selects an initial cell, an eNB transmits the corresponding information as part or all of broadcast information and system information.
    In a process of initial registration (attach/register) to a network and an eNB after the power of the UE is turned on, the corresponding information is transmitted as signaling information (RRC message) from an eNB.

In addition, the common slice and the service dedicated slice may be mixed and set in each layer of a protocol used by a UE or an eNB.

In the case of transmission/reception information generation, a UE and an eNB may select a slice suitable for the corresponding service and may transmit information about the slice to the UE. The transmission method may employ an implicit or explicit method.
    Example 1 (implicit): Transmitter selects service-based specific slice and receiver detects and determines the selection.
    Example 2 (explicit): transmitter transmits information about service type directly to receiver
    Embodiment: the corresponding information is included in eNB RRC signaling (e.g., paging message or the like) and transmitted
    Embodiment: each slice configuration/definition is mapped to index and index information is transmitted and received The following Table 1 shows an example of RAN slice information.

TABLE 1

| | Service | RAN Slice information |
|---|---|---|
| 0 | Common slice e.g. Initial access purpose) | (Slice configuration information) |
| 1 | eMBB | (Slice configuration information) |
| 2 | URLL | (Slice configuration information |
| 3 | mMTC | (Slice configuration information) |
| 4 | VoIP | (Slice configuration information) |
| 5 | Best Effort (BE) | (Slice configuration information) |

<Case of Dynamically Setting Slice>

A UE establishes a connection with an eNB using a common slice in an initial access, and includes a method of setting a dedicated slice based on a service type of transmission/reception information generated in the UE and the eNB.

If an eNB and a UE perform a transmission/reception operation by applying a specific slice, different transmission/reception methods per-service or different transmission/reception operations may be used as described in the above Table.

The following Table 2 shows that an eNB and a UE may have different configurations when performing a transmission/reception operation by applying a specific slice.

TABLE 2

| eNB/Network | UE |
|---|---|
| Common slice use | Common transmission/reception operation between services |
| Service dedicated slice use | Transmission/reception operation per-service |
| Common slice use | Transmission/reception operation per-service |
| Service dedicated slice use | Transmission/reception operation per-service |
| Service dedicated slice use | Transmission/reception operation per-service |

The common slice and the dedicated slice may be separately applied to the time, frequency, and spatial resources allocated to transmit and receive information between the UE and the eNB, and to the PHY layer channels and functions transmitted and received by the corresponding resources.

The following Table 3 shows options for applying a common slice or applying a per-service dedicated slice to each of signals transmitted/received in an idle state.

TABLE 3

| | Signal and channel Signal type | | | | | | |
|---|---|---|---|---|---|---|---|
| | Sync signal | MIB | SIB | Paging PHY Channel | RACH | RRC connection request/setup | Control signal |
| Operating slice | PSCH/ SSCH | PBCH | PDSCH | PDSCH | PRACH | PDSCH | PDCCH |
| Common | x | | | | | | |
| Dedicated | | x | x | | | | |

The following Table 4 shows options for applying a common slice or applying a per-service dedicated slice to each of signals transmitted and received in a connected state.

TABLE 4

| | Signal and channel | | | | | |
|---|---|---|---|---|---|---|
| Operating Slice | RRM-RLF operation | RRC configuration | PDCP configuration | RLC configuration | MAC configuration | PHY configuration |
| Common | | x | | | | |
| Dedicated | x | | x | x | x | x |

In addition to the examples presented in the above Table, various sets of the common slice and the dedicated slice can be set.

The name of the above-described slicing concept is not limited to slice and may be referred to as another term having the same meaning (e.g., partition, allocation, resource component, etc.).

The term 'service' as used in the disclosure is not limited to the above examples (eMBB, URLL, mMTC, best effort, VoIP), and may have a set of various requirements (transmission delay time, QoS, QoE, data rate, etc.) for information transmission performance.

Hereinafter, according to various embodiments of the disclosure, a method of operating a system in a sliced RAN environment in which PHY numerology and MAC configuration are different per-service having different requirements will be described.

A method of setting a RAN slice performing an idle mode operation, per-service is suggested, and therefore it is possible to improve UE/eNB energy efficiency through overhead information transmission/reception reduction.

As to the following operation, steps of performing an idle operation using a RAN slice will be described.

Step of setting a part or all of the PHY/MAC slice based on the operation and configuration information of a PHY layer and a MAC layer required per-service or commonly required between services;

The configuration information may be configuration in the RRC, PDCP, RLC, MAC, and PHY layers including parameters for controlling an idle state operation and the related signal transmission/reception operation.

Examples of the configuration information may include per-service configuration of broadcast information content, configuration of a transmission/reception period and update period of broadcast information, synchronization signal transmission/reception configuration, configuration of random access operation control and configuration of random access resources, configuration of content and transmission/reception of a paging message, control channel configuration and configuration of control signal transmission/reception, and the like.

Step of transmitting information about the slice configuration to a UE and an eNB or storing the same;

Step of selecting, by a UE or an eNB, a slice for idle state operation performance and related signal transmission/reception;

The slice for the idle operation may be selected as a common or service dedicated slice, and a definition method of each slice and configuration method by a UE/eNB may include methods according to the suggested content.

A criterion for selecting the slice includes a plurality of cases such as selection based on service information, selection based on the slice used by a UE or eNB, and the like.

Step of performing, by a UE or an eNB, an idle state operation by applying the slice configuration and transmitting/receiving a wireless access signal as necessary;

The idle state operation may include PLMN selection, cell selection and reselection, paging message reception, random access, and overall operations performed in the idle state of a mobile communication system. Each of the operations may be supported in either a common RAN slice or a dedicated RAN slice or both.

The UE and the eNB perform a part of the idle operation such as system sync signal transmission/reception, system information transmission/reception, etc., through the common RAN slice, and perform the other idle operations such as paging transmission/reception, random access, call configuration, etc., in different methods per-service through the dedicated RAN slice.

Example of Additional Operations for UE:

Step 0. Determining whether there is information about a service type of information to be transmitted and received mainly by a UE;

The information about the service type may be priority/preference information of provided service stored in the UE, service information obtained by performing packet inspection on uplink transmission data, or service information of downlink transmission data received from the eNB.

Step 1. Setting, by a UE, a RAN slice to be used for information transmission/reception;

The RAN slice may be a common slice or a service dedicated slice, and may be set in a static method or a dynamic manner as described.

The common slice or the dedicated slice may be selected based on presence and absence of the information about the service type or information about the service type in the previous step.

Step 1-1. If there is no information on preferred service type (or if the service type of the device is not determined or if there is no service information about transmission/reception), the common slice may be selected and the following operation may be performed.

Synchronization/SI reception;
Selecting cell;
If an eNB connection operation is for initial attach (registered to a network),
Attempting random access;
Requesting and receiving RRC signaling to configuration connection with the eNB;
Attaching request to RRC message;
(At this time, information about service preference/capability, or the like can be transmitted)
Performing connected mode operation
If a UE that has already been attached/registered in a network performs idle mode operation,
Receiving paging message (at paging occasion):
Service type information of data can be transmitted in an eNB and a network.
Attempting random access;
Requesting and receiving RRC signaling to configuration connection with the eNB;
Sensing service request;
(At this time, information about service preference/capability or the like can be transmitted together)
Performing connected mode operation Step 1-2. Else if service mode/preference is known (or if the service type of the device is determined, e.g., mMTC type device)

Use dedicated slice/configuration to perform the above operations;

The order of the operations and whether the operations are performed may be changed as necessary.

The following Table 5 shows an example of slice configuration per signal.

TABLE 5

| | Signal and channel | | | | | |
| --- | --- | --- | --- | --- | --- | --- |
| | Signal type | | | | | |
| | Sync signal | MIB | SIB | Paging PHY Channel | RACH | RRC connection request/setup |
| Operating slice | PSCH/ SSCH | PBCH | PDSCH | PDSCH | PRACH | PDSCH |
| Common | x | x | x | x | | |
| Dedicated | | | | | x | x |

Figure 3:
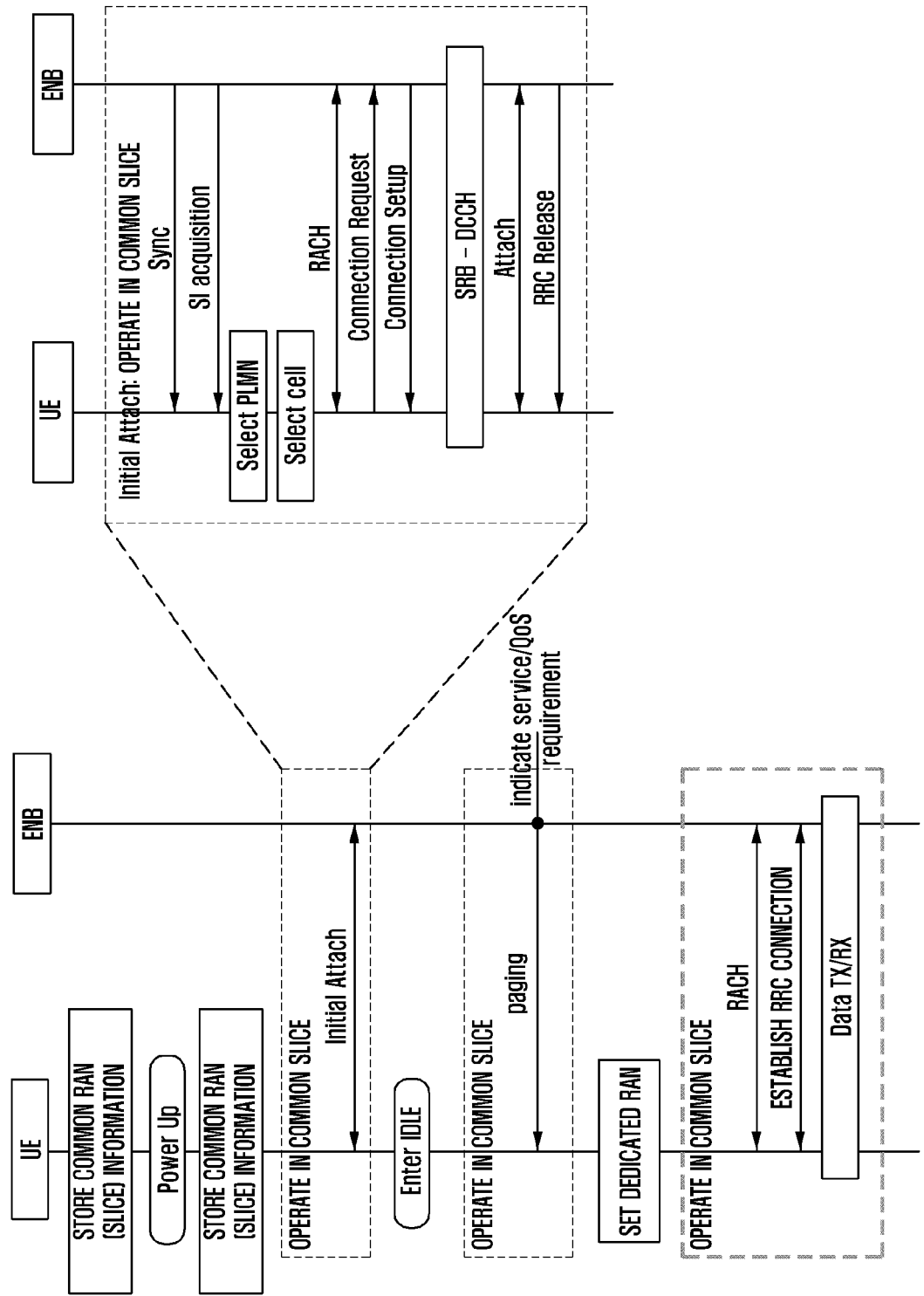
FIG. 3 is a flowchart illustrating an example of an initial attachment and idle state operation using a common RAN according to an embodiment of the disclosure.

FIG. 3 is a flowchart illustrating an example of an initial attachment and idle state operation using a common RAN according to an embodiment of the disclosure.

A UE may acquire symbol timing, physical cell ID, subframe timing, etc., in synchronization with each cell.

Figure 4:
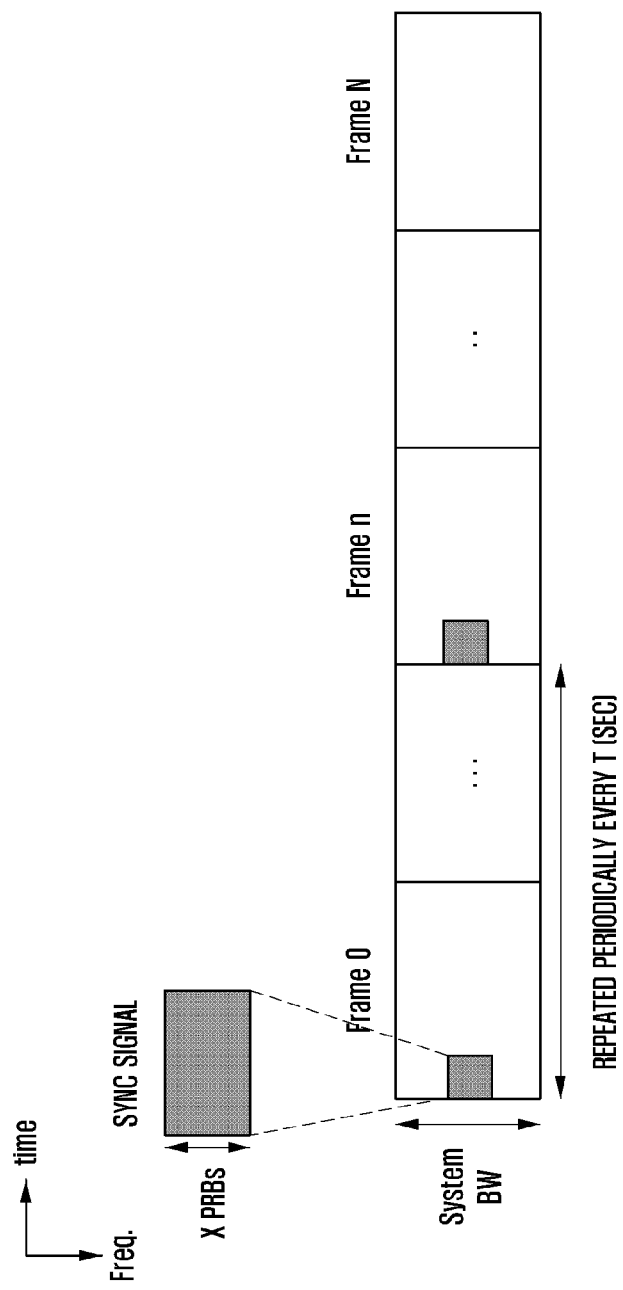
FIG. 4 is a diagram illustrating an example of a synchronization signal transmission using a common RAN according to an embodiment of the disclosure.

Referring to FIG. 4, in a frame composed of N subframes, it can be seen that, for example, a sync signal transmission location is fixed in a frequency and time space. In the example of FIG. 4, the sync signal may be transmitted through a center x RB of a first frame transmitted every T seconds.

As an embodiment of transmission/reception of system information through a common slice, a PBCH transmission/reception operation may be performed according to the content set in a slice, and PDSCH may be decoded in a scheduled location to acquire SIBx (x=1, 2, 3, . . . ).

As an embodiment of an operation of performing random access through a common slice, in a case in which the purpose of call configuration is initial attach, the random access can be performed through a common slice. At this time, common slice PRACH configuration information may determine PRACH resource information according to a configuration value which is acquired from SIB or determined in advance. Hereinafter, a detailed PRACH procedure may be similar to the operation of the conventional mobile communication system.

As an embodiment of an operation of performing random access through a dedicated slice, in a case in which the purpose of call configuration is configuration of MT call through paging or configuration of MO call per-service, the random access may be performed through the dedicated slice. The paging signal may include information about service. At this time, dedicated slice PRACH configuration information may determine PRACH resource information according to a configuration value which is acquired from SIB received at the common slice or determined in advance. Hereinafter, a detailed PRACH procedure may be similar to the operation of the conventional mobile communication system.

As an embodiment of an operation of performing RRC connection setup and RRC reconfiguration through a common slice, in a case in which the purpose of call configuration is initial attach, RRC and lower layer operation configuration may be performed through the common slice.

As an embodiment of an operation of performing RRC connection setup and RRC reconfiguration through a dedicated slice, in a case in which the purpose of call configuration is configuration of MT call through paging or configuration of MO call per-service, RRC and lower layer operation configuration may be performed through the dedicated slice. The paging signal may include information about service.

As an embodiment of an operation of performing RRC, NAS control message, and user data through a common slice, in a case in which the purpose of call configuration is initial attach, RRC information transmission/reception may be performed through the common slice.

As an embodiment of an operation of performing RRC, NAS control message, and user data through a dedicated slice, in a case in which the purpose of call configuration is configuration of MT call through paging or configuration of MO call per-service, RRC information transmission/reception may be performed through the dedicated slice. The paging signal may include information about service.

As an embodiment of an operation of performing a paging message through a common slice, the paging message may be transmitted and received according to the content set in the common slice. The paging signal may include information about service.

According to an embodiment of the disclosure, a service dedicated slice may be applied.

The following Table 6 shows another example of slice configuration per signal.

TABLE 6

| | Signal and channel Signal type | | | | | |
|---|---|---|---|---|---|---|
| | Sync signal | MIB | SIB | Paging | RACH | RRC connection request/setup |
| | PHY Channel | | | | | |
| Operating Slice | PSCH/ SSCH | PBCH | PDSCH | PDSCH | PRACH | PDSCH |
| Common | x | x | x | | x | x |
| Dedicated | x | x | x | x | x | x |

TABLE 7

| | Signal and channel Signal type | | | | | |
|---|---|---|---|---|---|---|
| | Sync signal | MIB | SIB | Paging | RACH | RRC connection request/setup |
| | PHY Channel | | | | | |
| Operating Slice | PSCH/ SSCH | PBCH | PDSCH | PDSCH | PRACH | PDSCH |
| Common | | x | x | | | |
| Dedicated | | x | x | | | |

Figure 5:
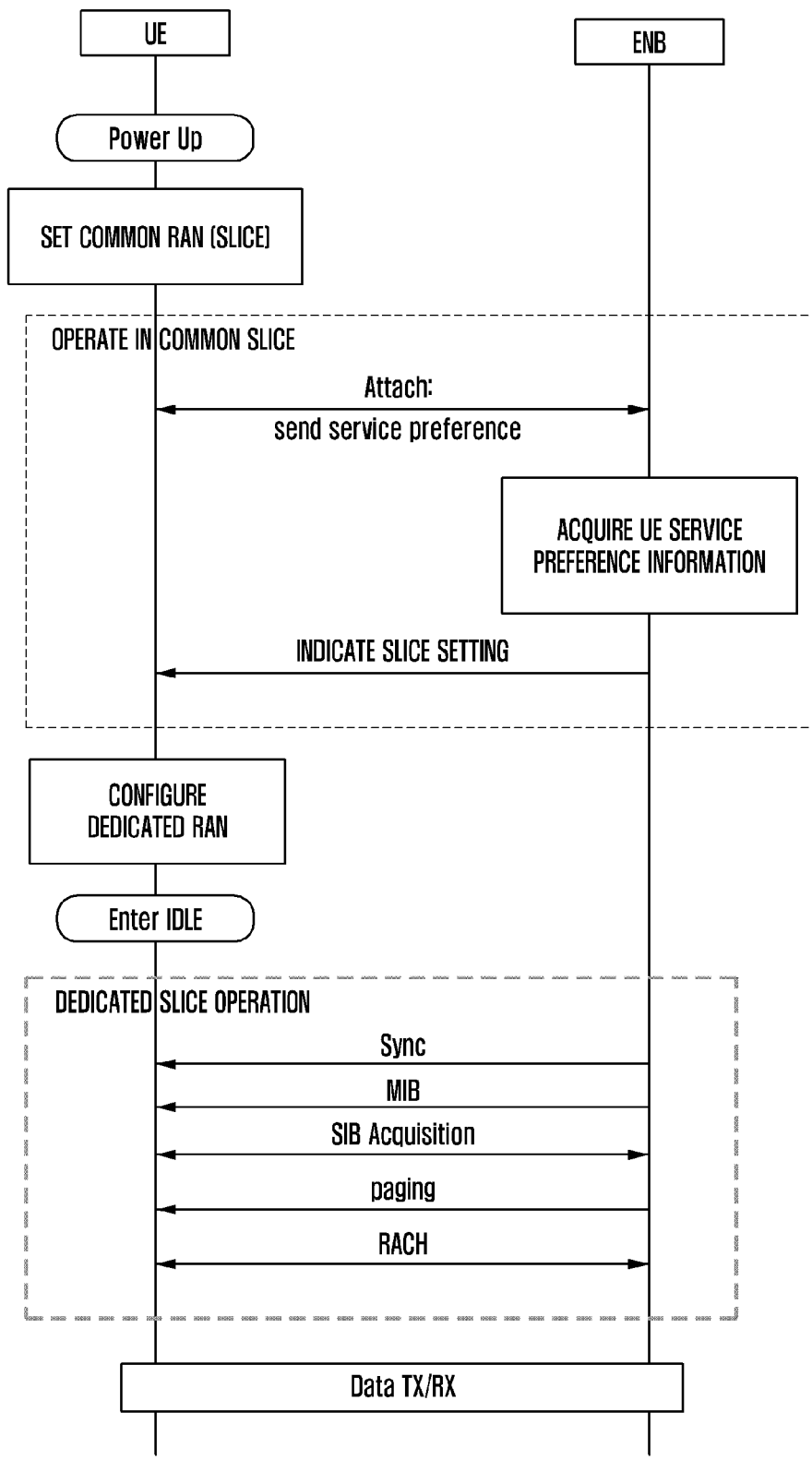
FIG. 5 is a flowchart illustrating configuration and use of a dedicated RAN according to an embodiment of the disclosure.

FIG. 5 is a flowchart illustrating configuration and use of a dedicated RAN according to an embodiment of the disclosure.

A UE may perform an idle mode operation for an initial attachment on the common slice as described above.

The UE may transmit a connection request message within an RRC connection setup completion message, or transmit service capability/preference information to an eNB/network in a method of indicating a random access resource (which may mean a preamble sequence) or the like.

The eNB/network may transmit, to the UE, information about dedicated RAN slice configuration to a part of the content of an RRC reconfiguration message or a part of the content of an RRC disconnection message.

For example, dedicated sync configuration may include parameters such as a signal transmission location (freq/time), period (e.g., mMTC is set to be long and URLL/eMBB/VoIP is set to be short to acquire rapid synchronization), etc.

According to an embodiment of the disclosure, a method of supporting one or more configurations for a physical channel and a method of providing information about physical channel configuration are provided.

The content of the 'physical channel configuration' may include time/frequency resources of the physical layer, structure thereof, transmission/reception signals, and the like (e.g., some or all of PDCCH, PBCH, PHICH, PCFICH, PUCCH, PRACH areas).

The eNB may provide information about how the frequency/time resources are set (e.g., symbol/subframe/frame structure in which signals are transmitted).

The UE may acquire information about the physical channel configuration after synchronization with a specific cell.

Meanwhile, a method of transmitting the physical channel configuration information may include various examples as follows.

Figure 6:
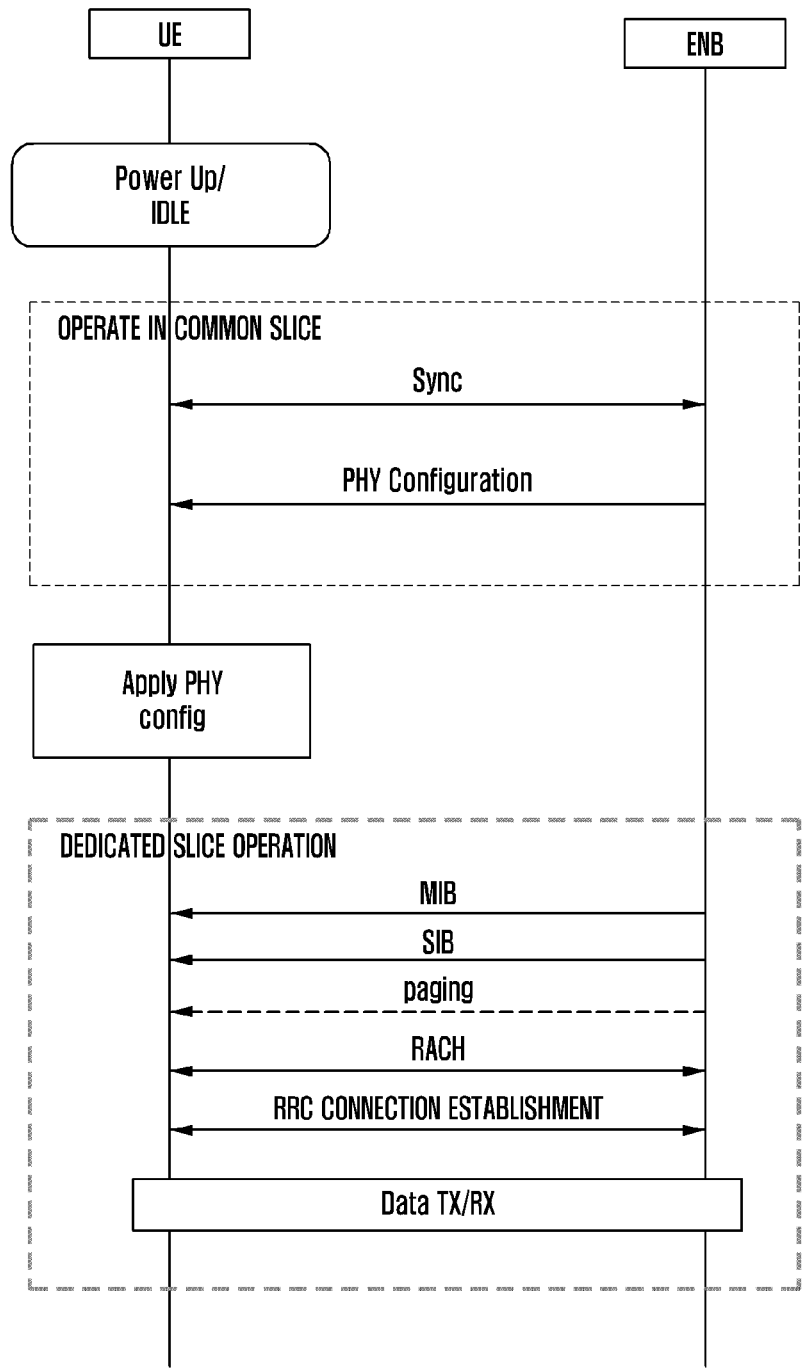
FIG. 6 is a flowchart illustrating an example of physical layer configuration information transmission/reception according to an embodiment of the disclosure.
Figure 7:
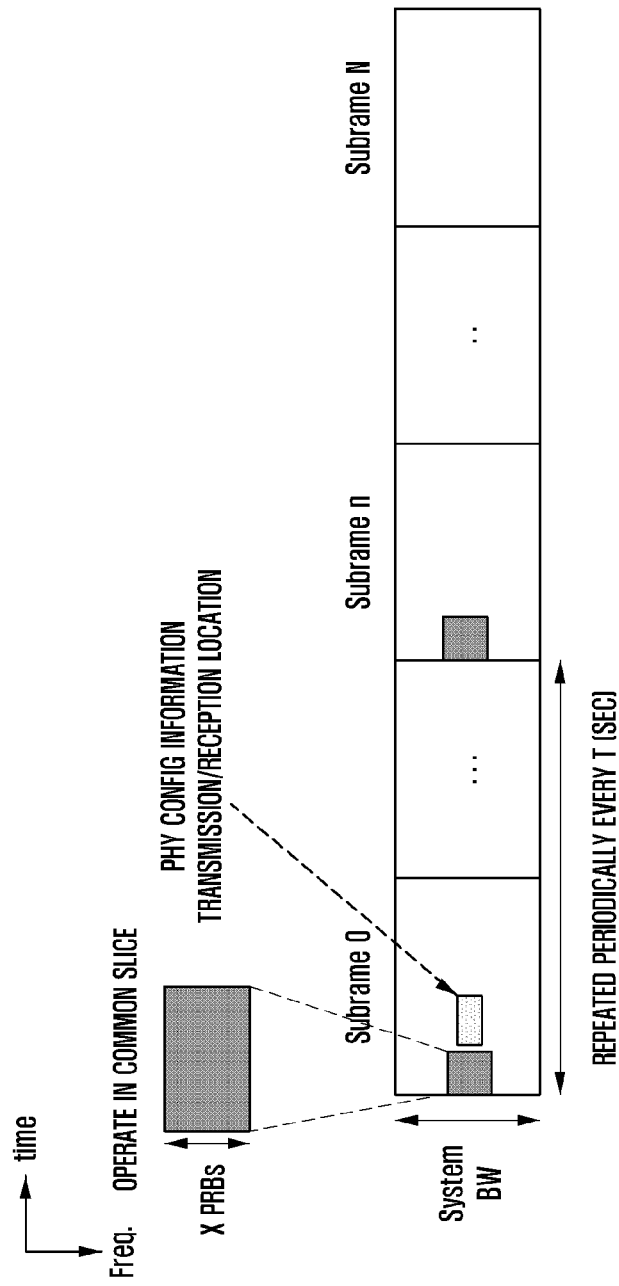
FIG. 7 is a diagram illustrating an example of physical layer configuration information transmission/reception according to an embodiment of the disclosure.

Referring to FIG. 6, information about physical channel configuration (PHY configuration) may be transmitted (can be defined as a common slice) at a fixed resource location, as an example. Referring to FIG. 7, in a frame composed of N subframes, for example, a physical channel configuration transmission location may be fixed in a frequency and time space.

Figure 8:
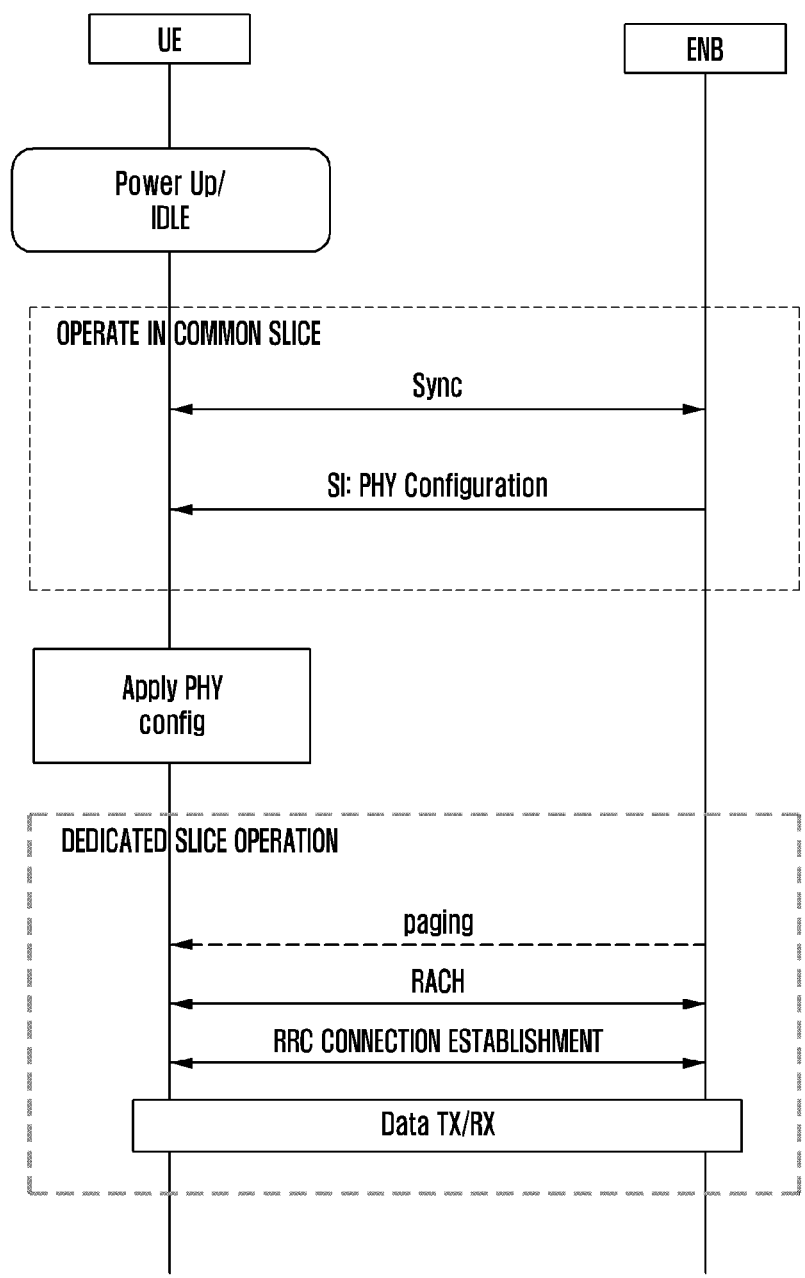
FIG. 8 is a flowchart illustrating another example of physical layer configuration information reception according to an embodiment of the disclosure.

Referring to FIG. 8, as another example, the PHY configuration information may be transmitted as system information (SI), using fixed scheduling of MIB (and SIB).

Meanwhile, as still another example, the PHY configuration information may be transmitted as SI, using a RAN slice structure.

The following Table 7 shows an example of SI information transmission/reception scheme (overhead reduction scheme) using the RAN slice structure.

The UE may receive the SI transmitted by the eNB after synchronizing a signal using a common or dedicated slice configuration.

Figure 9:
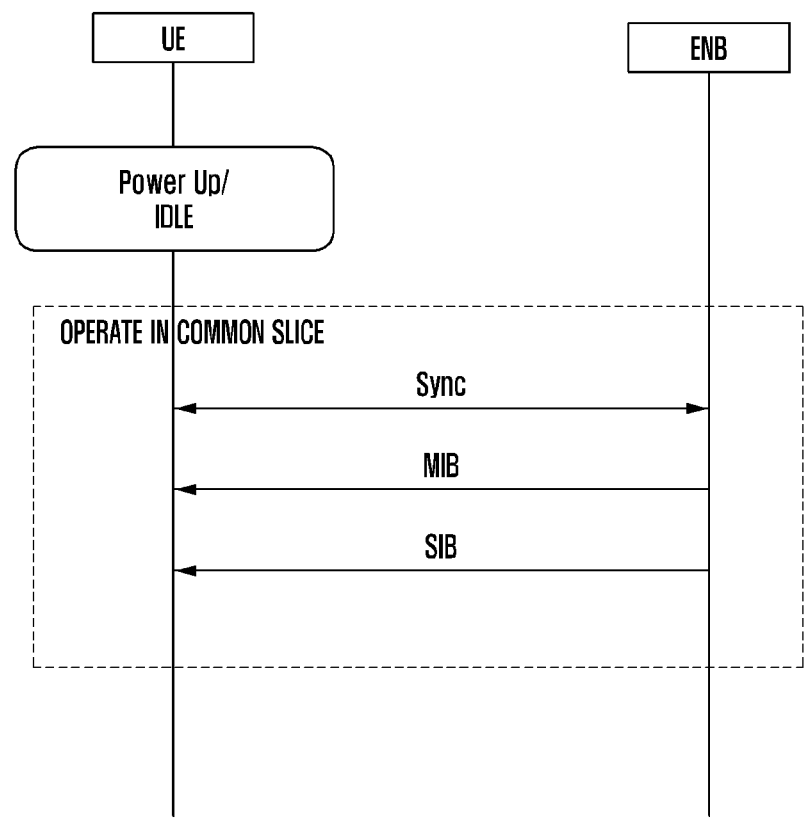
FIG. 9 is a flowchart illustrating an example of system information transmission/reception according to an embodiment of the disclosure.

For example, referring to FIG. 9, the eNB and the UE may always transmit and receive MIB and SIB in a fixed resource location in the common configuration.

Figure 10:
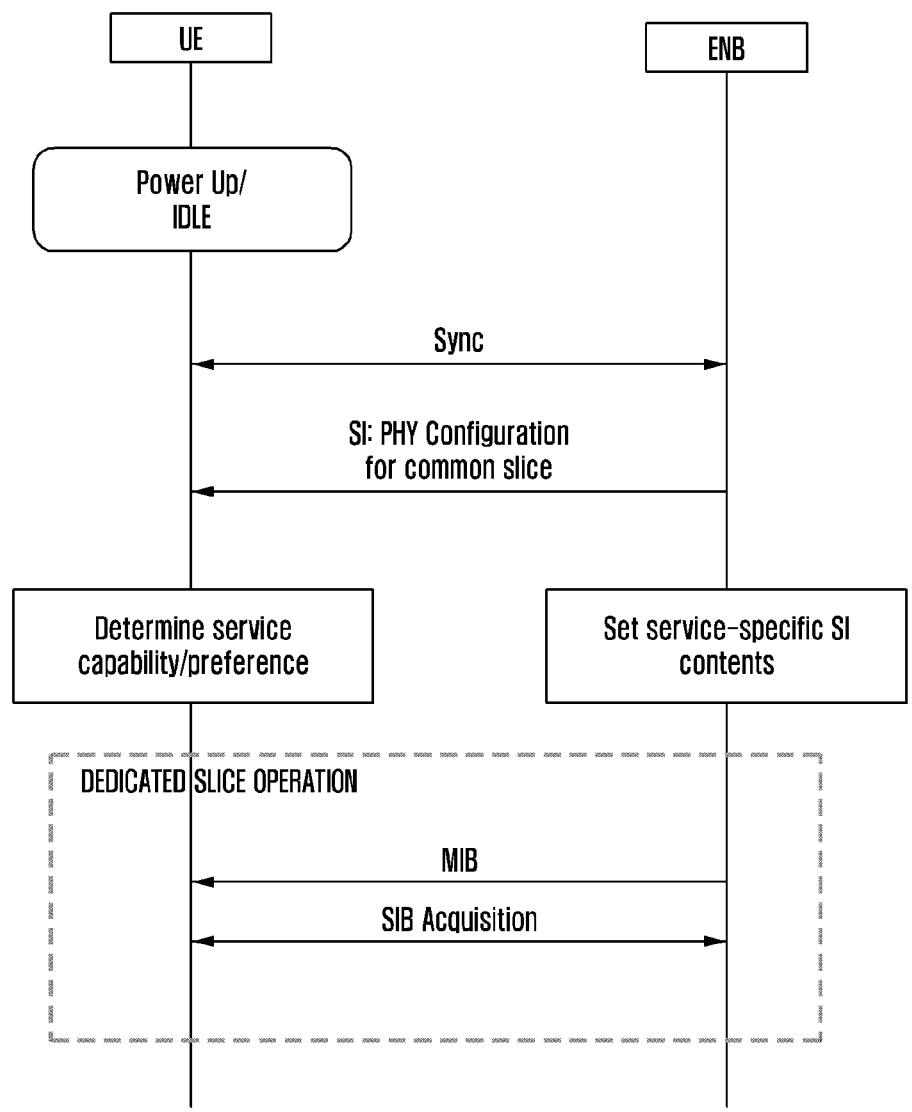
FIG. 10 is a flowchart illustrating another example of system information transmission/reception according to an embodiment of the disclosure.
Figure 11:
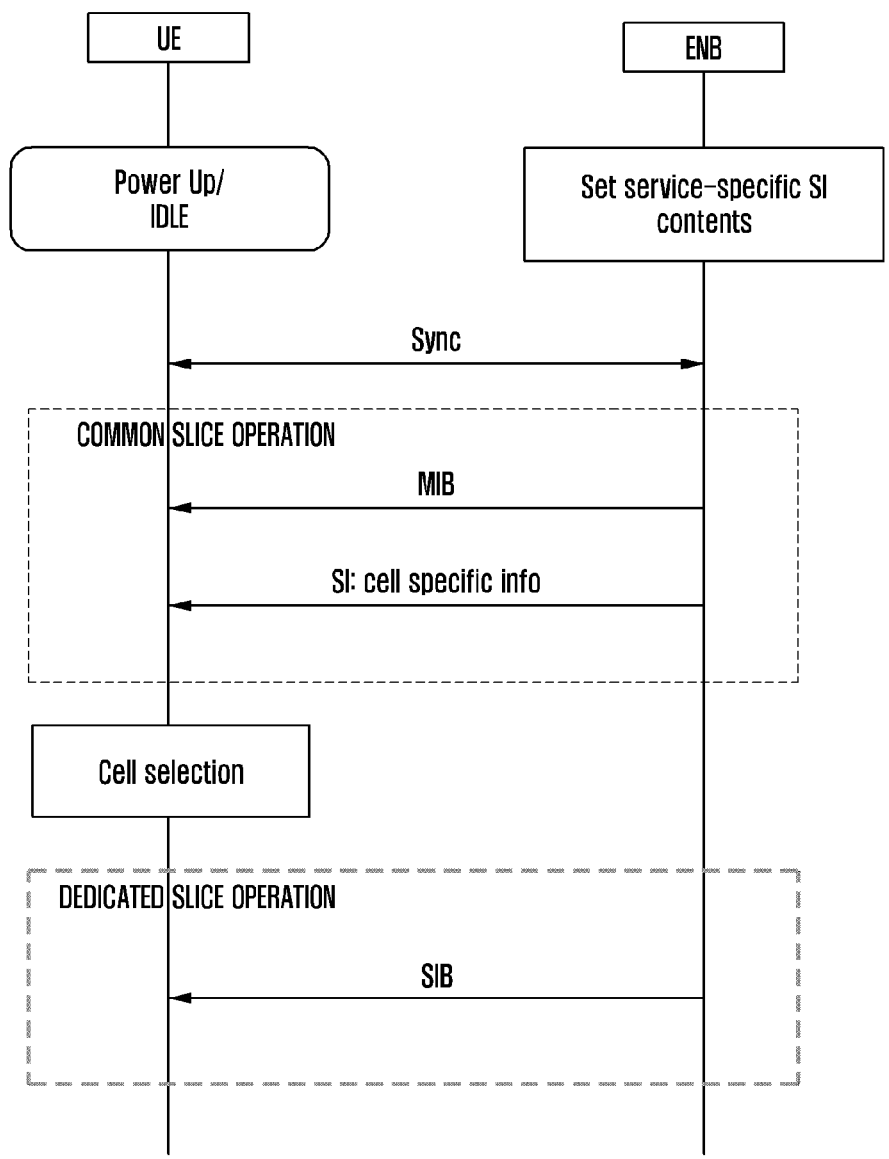
FIG. 11 is a flowchart illustrating still another example of system information transmission/reception according to an embodiment of the disclosure.

For example, referring to FIGS. 10 and 11, the eNB may differently apply SI-related configuration per-service and may transmit the applied configuration to the UE, in various methods.

In FIGS. 10 and 11, a service dedicated slicing method may include the following methods.

a) Method in which eNB Varies Transmission Configuration

The eNB may transmit different contents to the MIB and/or the SIB per-service in the above RRC.

For example, a value of DL-bandwidth of the MIB transmitted by the eNB may be differently designated per-service and transmitted.

In the case of mMTC as an example, the eNB sets DL-bandwidth=B_mMTC (unit: Hz), and in the case of eMBB, the eNB sets DL-bandwidth=B_eMBB (unit: Hz). At this time, B_eMBB is larger than B_mMTC.

Similarly, in the case of URLLC, DL_bandwidth=B_URLL may be set and a value thereof may be set differently from another service. In addition, a value of essential information (Phich configuration, etc.) included in the MIB may be changed per-service, and the SIB may be grouped per-service.

The eNB may apply dedicated scheduling per-service to the MIB (period, receive duration, location within frame/sub-frame, etc.) and may transmit and receive the result.

The ENB may apply dedicated scheduling per-service to the SIB (period, SI transmission/reception window length, receive duration, location within frame/sub-frame, etc.) and may transmit and receive the result (Battery life or latency critical service-oriented UE is set to receive minimally required SIB in a minimum amount of time).

b) Method in which eNB Broadcasts SI Content Regardless of Services and UE Controls SI Reception Operation For example, the eNB may transmit MIB content as a BCCH-BCH message within a protocol, and may transmit the BCCH-BCH message on a PBCH channel. At this time, the UE may repeatedly receive the PBCH over a plurality of times, and at this time, the number of repetitive receptions may be controlled according to the coverage and signal strength of the UE.

Figure 12:
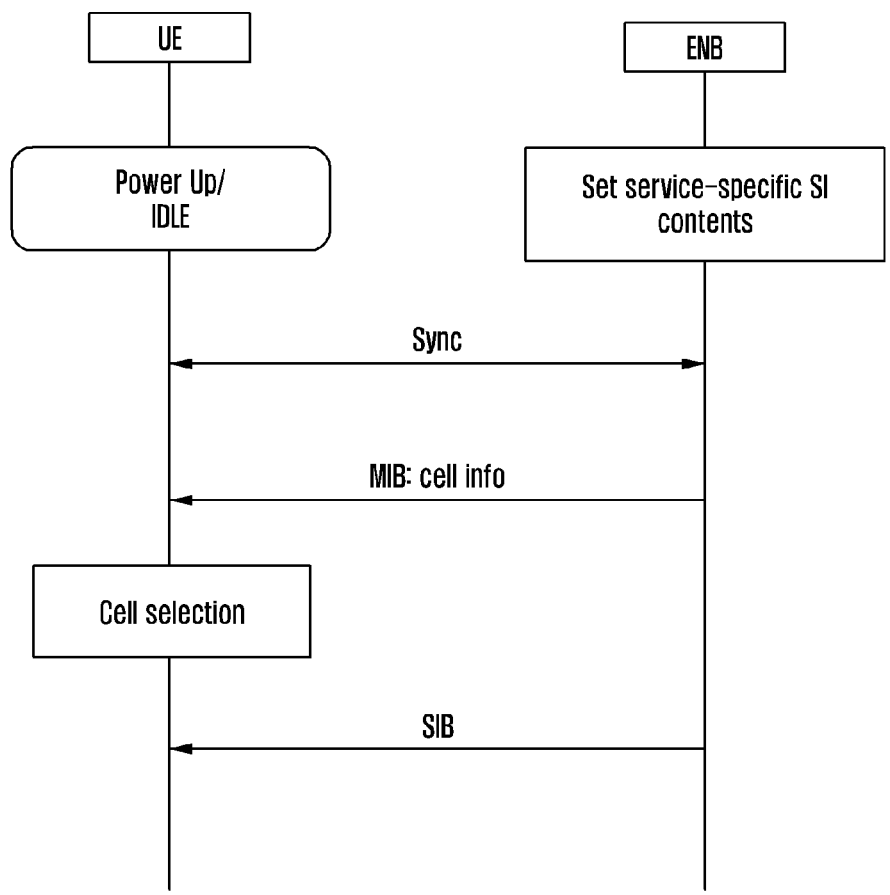
FIG. 12 is a flowchart illustrating yet another example of system information transmission/reception according to an embodiment of the disclosure.
Figure 13:
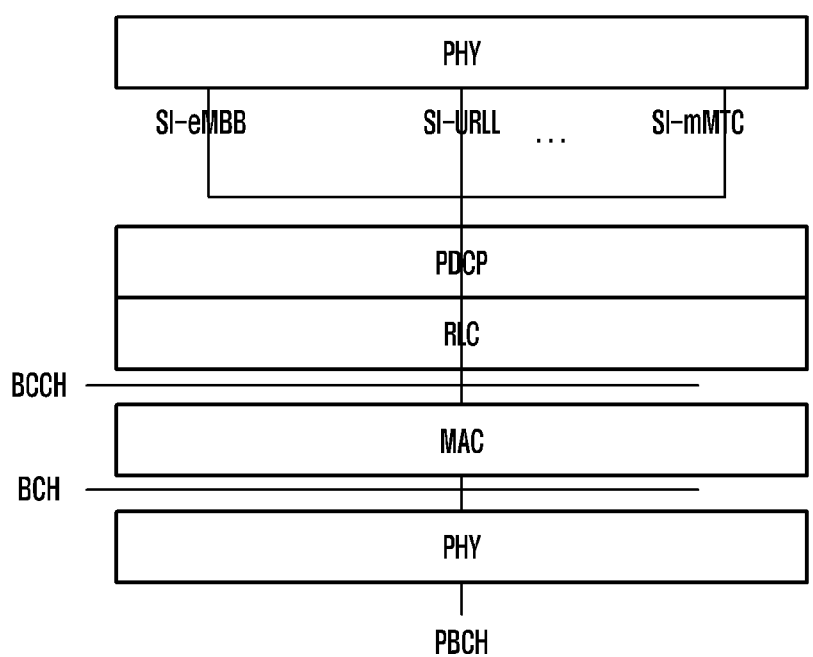
FIG. 13 is a diagram illustrating an example of a protocol related to system information content configuration per-service according to an embodiment of the disclosure.
Figure 14:
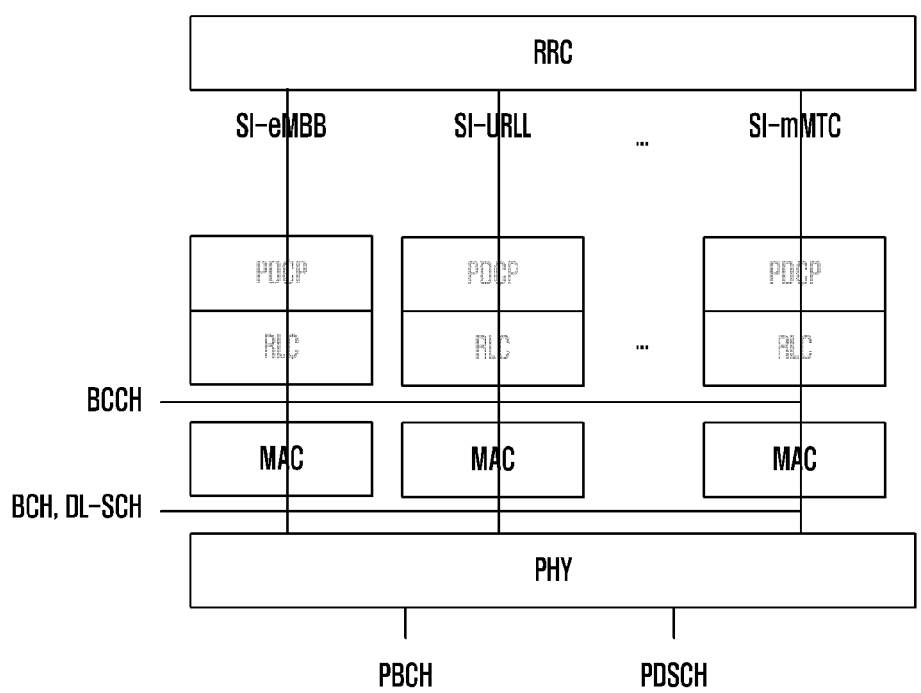
FIG. 14 is a diagram illustrating an example of MAC layer slicing for reducing system information overhead according to an embodiment of the disclosure.

Meanwhile, referring to FIG. 12, the eNB may apply SI-related configuration differently per-service and may transmit the result to the UE. If synchronization is operated in a common slice (e.g., sharing a physical channel configuration), common configuration for PHY PBCH transmission may be one PBCH configuration in which the ENB transmits MIB (BCCH-BCH message). FIG. 13 illustrates an example of a protocol that sets SI contents (including MIB and SIB) per-service, and FIG. 14 illustrates an example of an MAC configuration slicing protocol for reducing SI overhead.

Figure 15:
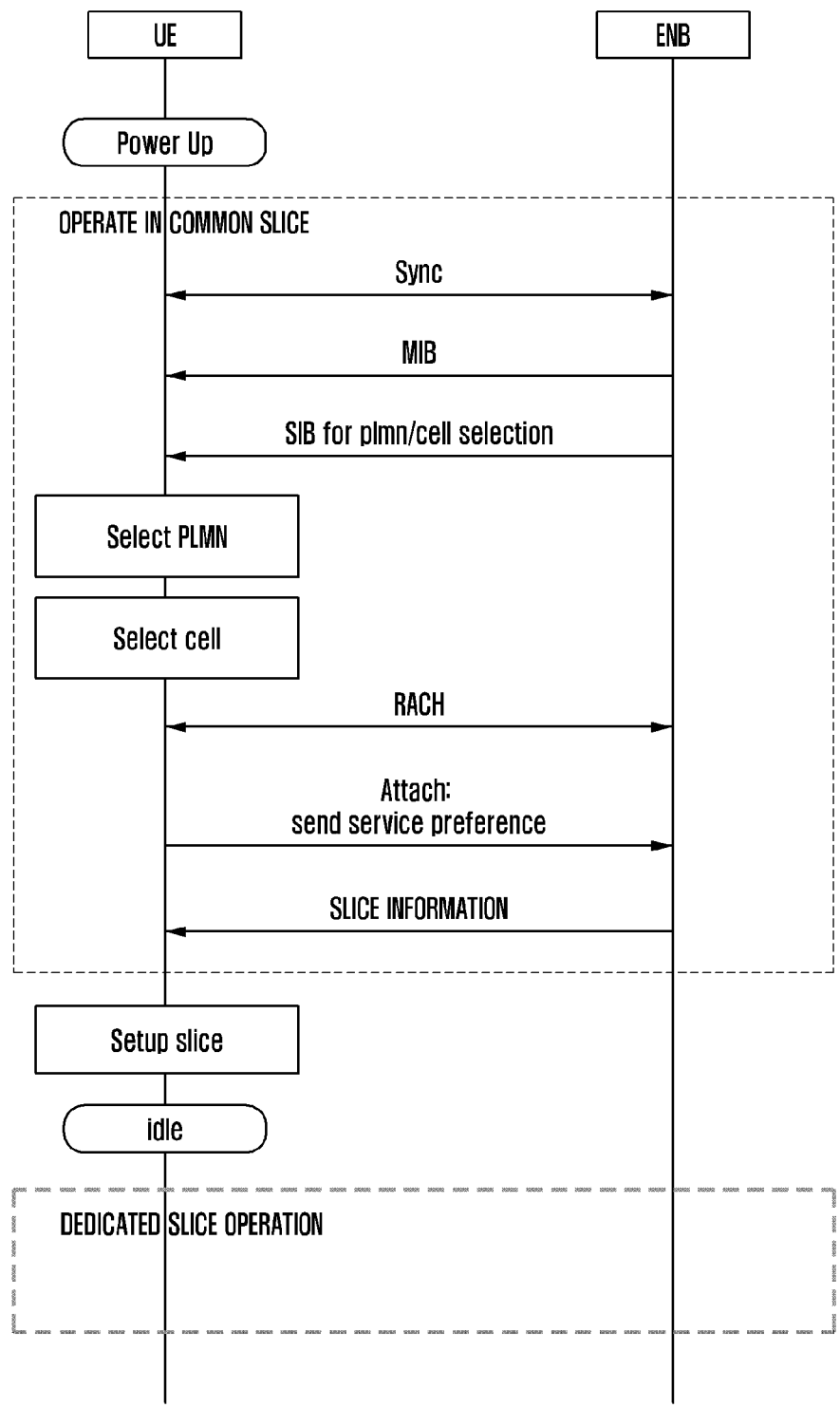
FIG. 15 is a flowchart illustrating an example of the performance of PHY/MAC configuration to be used by a UE in an idle state according to an embodiment of the disclosure.

Referring to FIG. 15, the eNB may transmit, to the UE, PHY/MAC slice configuration to be used by a UE in an idle state as RRC signaling.

Meanwhile, a method of acquiring SI information of the UE may include a combination of the various suggestions.

Hereinafter, an initial attachment (e.g., transition from idle to connected state) operation using a sliced RAN structure, paging, and UL RACH operation will be described.

According to an embodiment, a method of performing a wireless access and a connection establishment operation in a common RAN slice is as follows.

In the case of Mobile Terminated (MT) or DL initiated access, the eNB receives a paging request message from an MME via an S1 interface. P0 is calculated based on S-TMSI and a UE identity index value, and RRC message paging is scheduled. Next, PDCCH is transmitted from the calculated P0 to each UE.

Meanwhile, all UEs use the same physical resource to monitor the PDCCH. A resource location for the PDCCH is the same for all UEs. Each UE monitors the PDCCH at P0 for P-RNTI (UE-specific P0). The PDSCH is read and a PCH transmission block is decoded to identify a paging message. If its ID is included, a connection at the uplink is started.

For an uplink connection, all UEs in the PHY may use a common PRACH location in time and frequency regardless of service. In the MAC, all UEs and services may use the same RACH procedure/configuration.

According to an embodiment, a method of performing a wireless access to a common slice in a downlink (for paging) and a dedicated slice in an uplink (RACH) is as follows.

In the case of mobile terminated (MT) or DL initiated access, an RRC-based operation may be performed.

For example, the eNB may receive a paging request message from the MME via the S1 interface and may calculate P0 for the related UEs. Next, the eNB may set a paging RRC message, and the paging message may include 'paging record' and may include information about a paged user (UE identity {example: IMSI/S-TMSI or the like}) and information about service (index to indicate service type {example: eMBB, URLL, mMTC, etc.}) (e.g., list or table). The eNB schedules a downlink data channel for RRC message paging. The P0 calculated for each UE transmits PDCCH.

All UEs may monitor a common PDCCH resource (common search space). A frequency location for the PDCCH is the same for all UEs. Each UE monitors the PDCCH at P- for P-RNTI (UE-specific P0). The UE reads the PDSCH and decodes a PCH transmission block to identify the paging message.

In an RRC idle mode, each 'paging record' is included in the paging message. The 'paging record' is matched with one of UE identifiers assigned by an UE-identity upper layer included in the paging record. In response to detection of the UE identifier corresponding to service information within the paging record, the UE initiates uplink connection on dedicated RAN slice/resource element.

Figure 16:
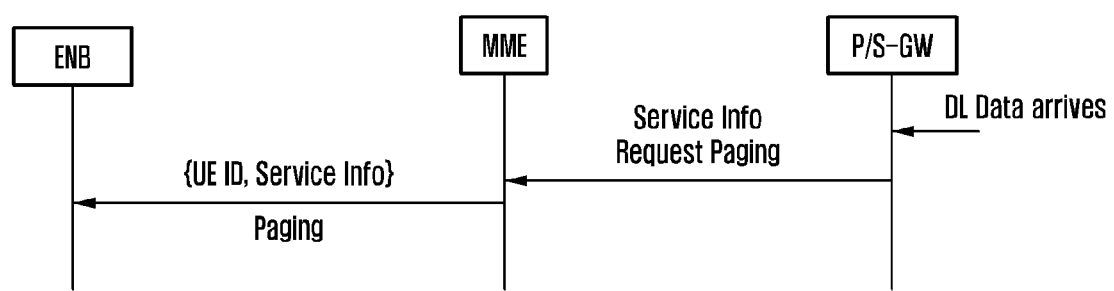
FIG. 16 is a flowchart illustrating an example of a network operation for enabling a PHY/MAC configuration operation according to an embodiment of the disclosure.

A network operation shown in FIG. 16 may be used to enable the above operation. That is, the network may provide one or more pieces of the following MT data.

Type of service
Quality of service, requirements
Priority level

The UE may connect to the network with one or more service capabilities (and corresponding priority level) information (e.g., the UE can mainly use eMBB service).

For an uplink connection (including mobile originated (MO) case), dedicated RACH configuration per slice is used, and in the PHY, different PRACH resources within a frequency and time domain is set for each service. In the MAC, all UEs use the PRACH. If the PRACH is paged for eMBB service and uplink, for example, mMTC can transmit an RACH sequence longer, but the number of RACH attempts may be limited. Alternatively, the UE receiving the paging message may perform RACH backoff based on other paged UE services and priority information.

Figure 17A:
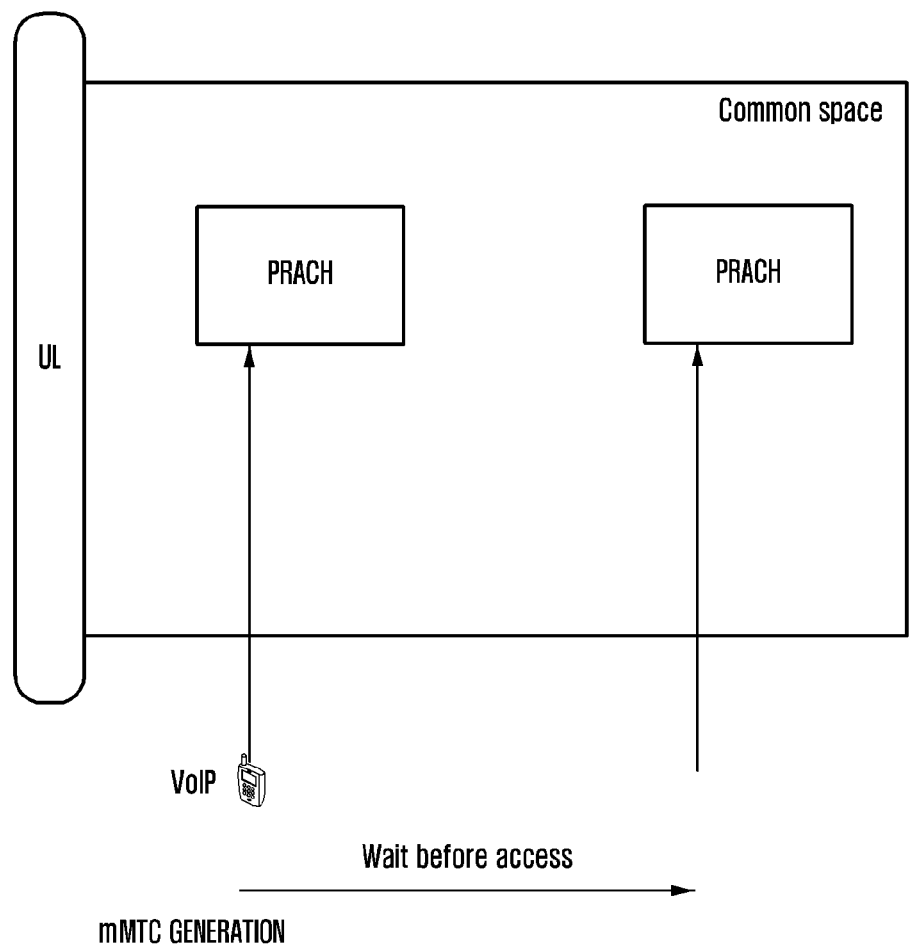
FIG. 17A is a diagram illustrating a connection for service use in a common space.
Figure 17B:
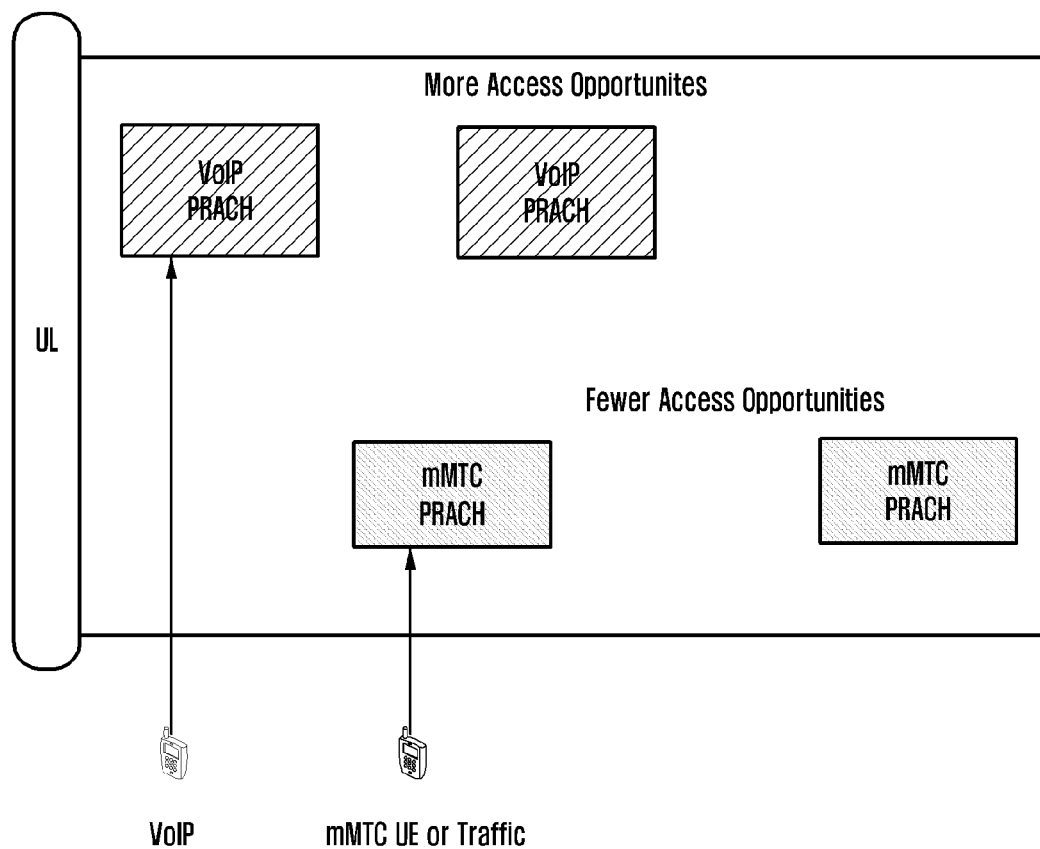
FIG. 17B is a diagram illustrating a connection for service use in PHY/MAC configuration according to the embodiment of the disclosure.
Figure 18:
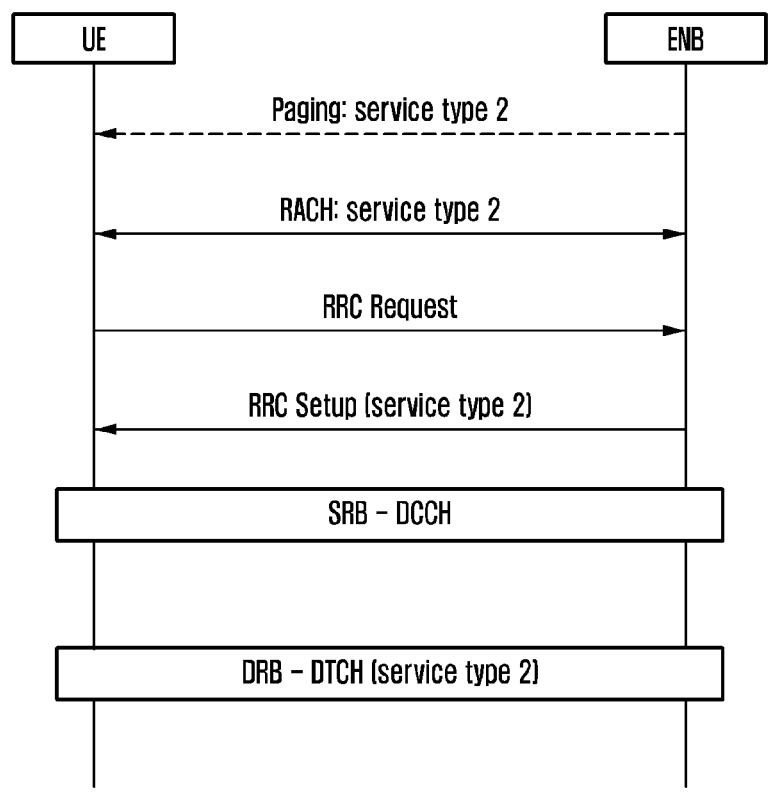
FIG. 18 is a flowchart illustrating a method of performing a connection using a dedicated layer slice per-service according to an embodiment of the disclosure.

For example, referring to FIG. 17A, in a common space, a connection of the UE may be delayed when different services (VoIP and mMTC) are generated. However, referring to 17B, the connection may be performed when each service is generated through a dedicated slice. At this time, access opportunities may be determined based on the priority. FIG. 18 illustrates a method of performing a connection using a dedicated slice according to the above embodiment.

According to an embodiment, a method of performing a wireless access to a dedicated RAN slice for downlink paging of UEs and a dedicated RS for an uplink connection is as follows.

Figure 19A:
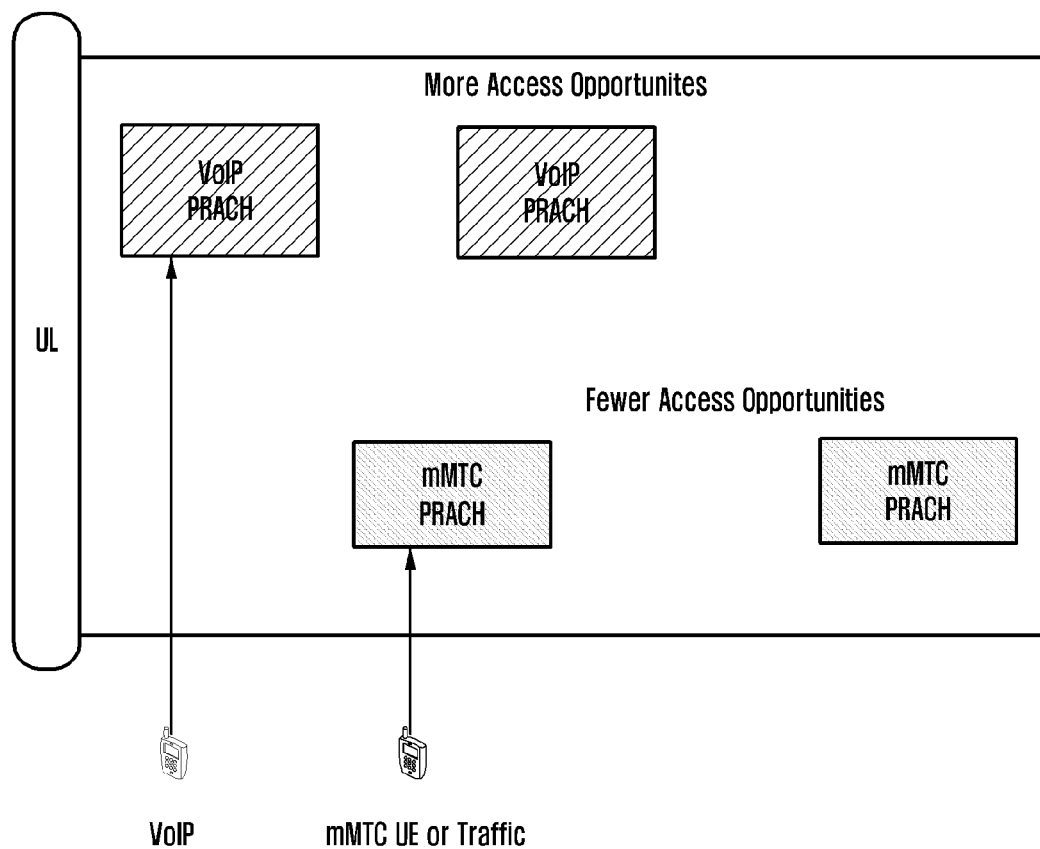
FIG. 19A is a diagram illustrating a connection in accordance with physical layer configuration divided per-service according to an embodiment of the disclosure.
Figure 19B:
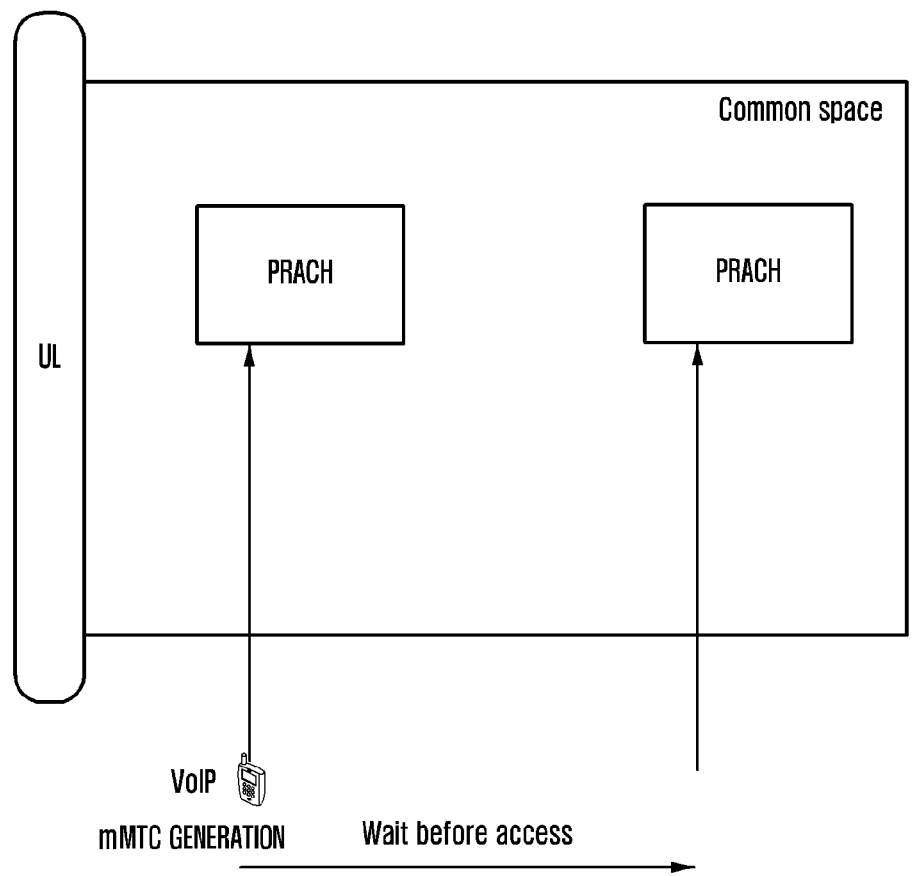
FIG. 19B is a diagram illustrating a connection in accordance with PRACH configuration per-service according to an embodiment of the disclosure.

In the case of mobile terminated (MT) or DL initiated access, the eNB may set UE-specific and/or service-specific paging occasion (PO). For example, VoIP and URLL may set a DRX period to be short, and may set the same when transmitting an RRC release message. Otherwise, the eNB may receive paging from an MME and may calculate the next P0 based on information paged to the UE. Alternatively, index n (the number of P0s required to wait before the eNB transmits scheduling information about the UE on the PDCCH) may be provided. The eNB may transmit the scheduling information at the corresponding P0. The UE may perform a connection (including the MO case). FIG. 19A shows a connection of the UE in the case of PHY layer configuration divided per-service, and FIG. 19B shows a connection of the UE in the case of PRACH configuration per-service.

According to an embodiment, with respect to the performance of the connection for the dedicated RAN slice for the downlink paging and the dedicated RS for the uplink connection, a downlink connection operation and an uplink connection operation may be performed using the service dedicated slice and the related operation.

Meanwhile, the operation of an idle UE using the RAN slice according to the embodiment of the disclosure is as follows.

The RAN slice performing a connected mode operation may be set per-service to improve UE energy efficiency.

For example, services and requirements provided by transmission/reception information generated in the UE or the eNB may be determined.

The UE may set a parameter for controlling the operation of the PHY layer and the MAC layer as part or all of PHY/MAC slice information. The parameter may be configuration in the RRC, PDCP, RLC, MAC, and PHY layers including a parameter for controlling a connected DRX operation and a handover operation of a mobile UE. Examples of the parameter include an inactivity timer length (start time of the DRX operation), a control channel and signal transmission/reception time of the UE, a length of a DRX period, etc. In addition, the parameter may include a parameter for triggering a handover such as a cell signal strength measurement frequency and a period, the number of times of transmission/reception of a handover control signal (signaling), the number of cells for measuring a signal strength by a UE, and a control signal transmission/reception time.

The UE may transmit or store information about the slice configuration to the UE and the eNB. The information may be transmitted and received by applying the slice configuration.

The specific operation of the UE may be as follows.

For example, the UE may determine a service type of a packet transmitted or received by the UE or a service type of data generated in the UE and the eNB. If the UE determines the same, the eNB may provide information about the service type.

The UE may determine the importance of connected mobility for the corresponding service. For example, in the case of URLL, eMBB, VoIP, etc., the importance and preference of connected mobility are determined as high priority, and when the service type of a transmission/reception packet generated in the UE/eNB is mMTC, the priority of the importance and preference of the connected mobility may be set to be low.

Mobility operation configuration may be performed based on the determination result. For example, in the case of mMTC, it can be set not to support the connected mobility. In case of URLL service, the number of times of cell signal measurement for idling and connected mobility operations may be set, and the number of times thereof may be a higher value than that in the case of mMTC. In addition, as values of the set parameters, values optimized for respective services and the requirements may be used. In addition, it is possible to determine whether the UE or the ENB supports the mobility through the setting, and the determination result may be configured as a part of the RAN slice.

Figure 20:
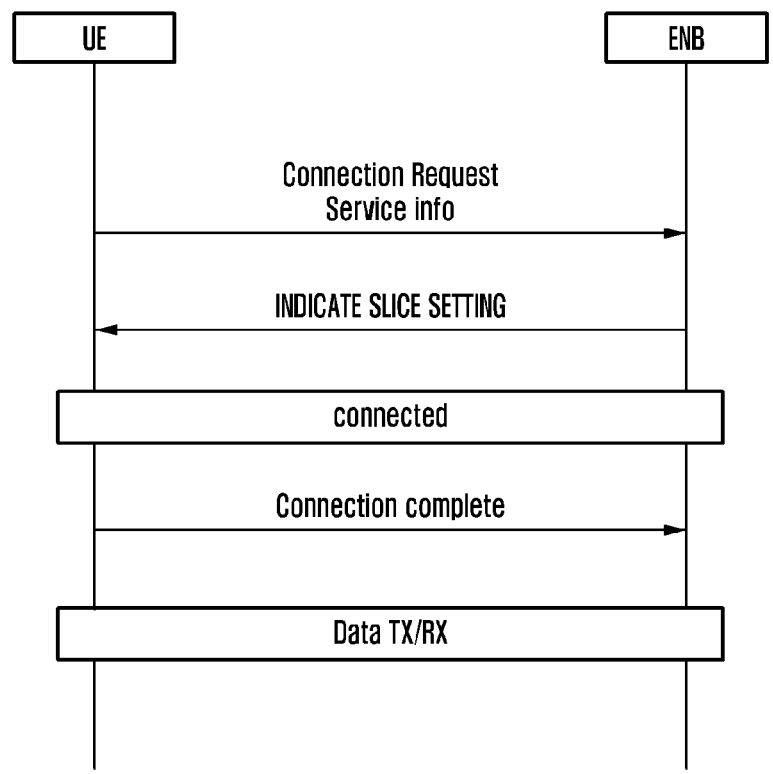
FIG. 20 is a flowchart illustrating another example of a RAN configuration method according to an embodiment of the disclosure.

Referring to FIG. 20, the UE may provide service information to the eNB. For example, the service information may be service preference information provided by the UE at the time of initial attachment. Alternatively, when paging is received or at the time of access in an idle state due to the generation of uplink data, the service information may be transmitted to the eNB. At this time, the RACH resource may be used (PRACH location, preamble, etc.) or may be transmitted (e.g., RRC connection request, connection setup complete, etc.) when the RRC connection is established. Also, in the case of idle access using the dedicated slice, when the eNB is determined as a signal reception location, the service information may be transmitted to the eNB.

The eNB may set the RAN slice based on the service information transmitted from the UE and may transmit slice/configuration to the UE. For example, the slice/configuration may be transmitted to the UE by RRC signaling.

Meanwhile, the RAN slice may be set by control per-service of the inactivity timer.

For example, if the UE transmits a notification indicating that it is an access attempt for mMTC data transmission to the eNB, the eNB may set the inactivity timer as x, and may transmit the set inactivity timer to the UE together with other slice information. The UE may establish the RRC connection with the eNB and may start data transmission/reception.

A UE MAC may restart the inactivity timer whenever a control channel (e.g., PDCCH) indicates new UL/DL data.

Figure 21:
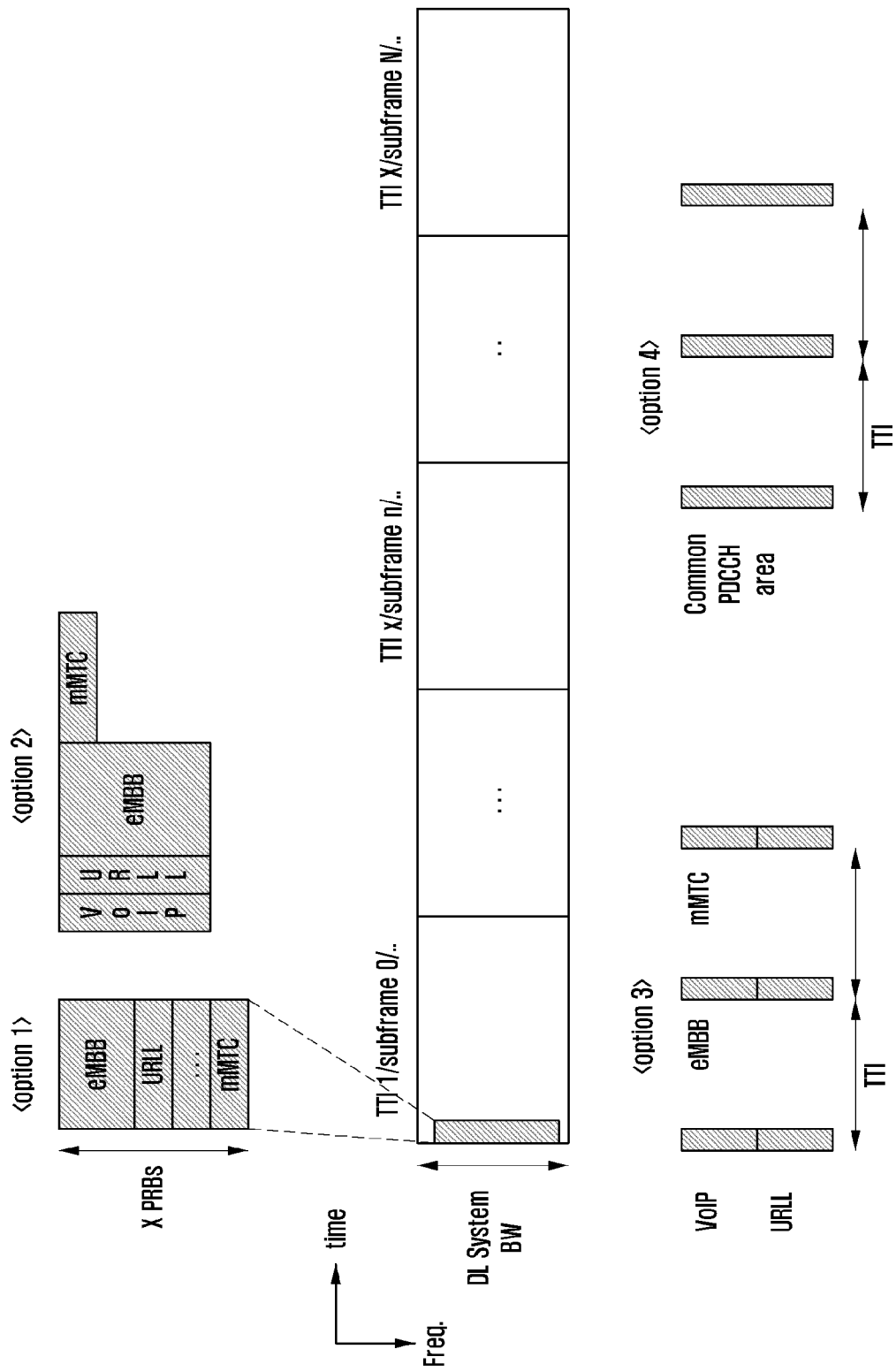
FIG. 21 is a diagram illustrating a method of applying RAN configuration to a control channel according to an embodiment of the disclosure.

According to various embodiments of the disclosure, as shown in FIG. 21, control channel slice design may be achieved by applying common transmission/reception configuration or transmission/reception configuration per-service to signals transmitted/received on a PDCCH channel and the PDCCH.

For example, a PDCCH search area may be set per-service, and may include common configuration per-service and dedicated configuration.

The operation of applying the slice to the control channel is applicable to both the idle state operation and the connected state operation of the UE.

According to the embodiment of the disclosure, a method of shortening a period (RRC connected period) during which a UE for improving UE power efficiency activates a wireless link is as follows.

A modem operation mode may be controlled based on QoS requirement characteristic information such as latency per support service type (eMBB, URLLC, mMTC) or per RAN Slice.

The information per support service or RAN slice may include at least one of the following information.

1) QoS requested by service or RAN slice
  i) QoS is a service requirement including data rate, latency, mobility, reliability, power consumption, and connection density.
2) PHY resource allocation information per-service or per-RAN slice
  i) Sub-carrier spacing,
  ii) Frame structures
3) L2 configuration information per-service or per-RAN slice
  i) Header compression and ciphering operation and omission based on PDCP layer and service vertical as an embodiment
  ii) Operation in RLC unacknowledged mode (e.g., sensor)
  Acknowledged mode only (e.g. mission critical services)
  iii) In MAC/PHY, carrier aggregation operation and omission configuration
  H-ARQ operation mode control method
  Spectral efficiency (massive broadband)
  Coverage (sensor, IoT), reliability (mission critical services)
  or latency (tactile Internet)
4) Warming up time (WUT) information per-service (per-RAN slice)
  iv) Synchronization procedure operation time
  Operation time increase/decrease information according to whether beamforming is performed
  v) System Information reception procedure operation time
  Operation time increase/decrease information according to whether beamforming is performed
  vi) Paging reception procedure operation time
  Operation time increase/decrease information according to whether beamforming is performed
  vii) Switching on hardware circuit
  viii) Including precise-clock,
  ix) RF circuit related massive antennas
  x) Additional high speed core processor
5) Promotion delay information per-service (per-RAN slice): cost (power consumption and delay time) information required in a step in which the UE including an example of transition from the RRC IDLE to the CONNECTED switches a low power mode to a data transmission/reception mode xi) Option information about signaling configuration required for transition from the RRC IDLE to the CONNECTED xii) Time and power consumption cost information required for the corresponding operation xiii) MME holds UE Context information even in the RRC idle mode, In the case in which S1-AP NAS service request and S1-AP initial context setup request can be omitted, it can be indicated as option, Operated as a determination criterion of a UE and/or eNB modem operation mode.

A modem operation mode control method based on the information per-support service or per-RAN slice may include at least one of the following operations.

1) Aggregation control operation based on QoS per-service or per-RAN slice

2) UE measurement period increase/decrease operation

3) RRC connected waiting time (Radio Tail) period control operation

RRC connected waiting time and radio tail period, and Inactivity timer control operation i) UE connection waiting time decrease control due to shortening of radio tail (inactivity timer)

ii) UE connection waiting time increase control due to extension of radio tail (inactivity timer)

4) Long DRX operation within UE connection mode

A. DRX period increase and decrease control

B. DRX duty cycle increase and decrease control

In addition, the content proposed by the disclosure can also be applied to a communication system using transmission/reception in a high frequency band and beamforming technology.

According to an embodiment of the disclosure, if a packet for various types of services is generated at the same time, the service priority is determined and RAN slice configuration, selection and application may be performed based on the priority. Alternatively, the RAN slice may be set/selected based on the highest service requirement (e.g. high speed/low latency) and data for other services may be piggybacked and transmitted.

Figure 22:
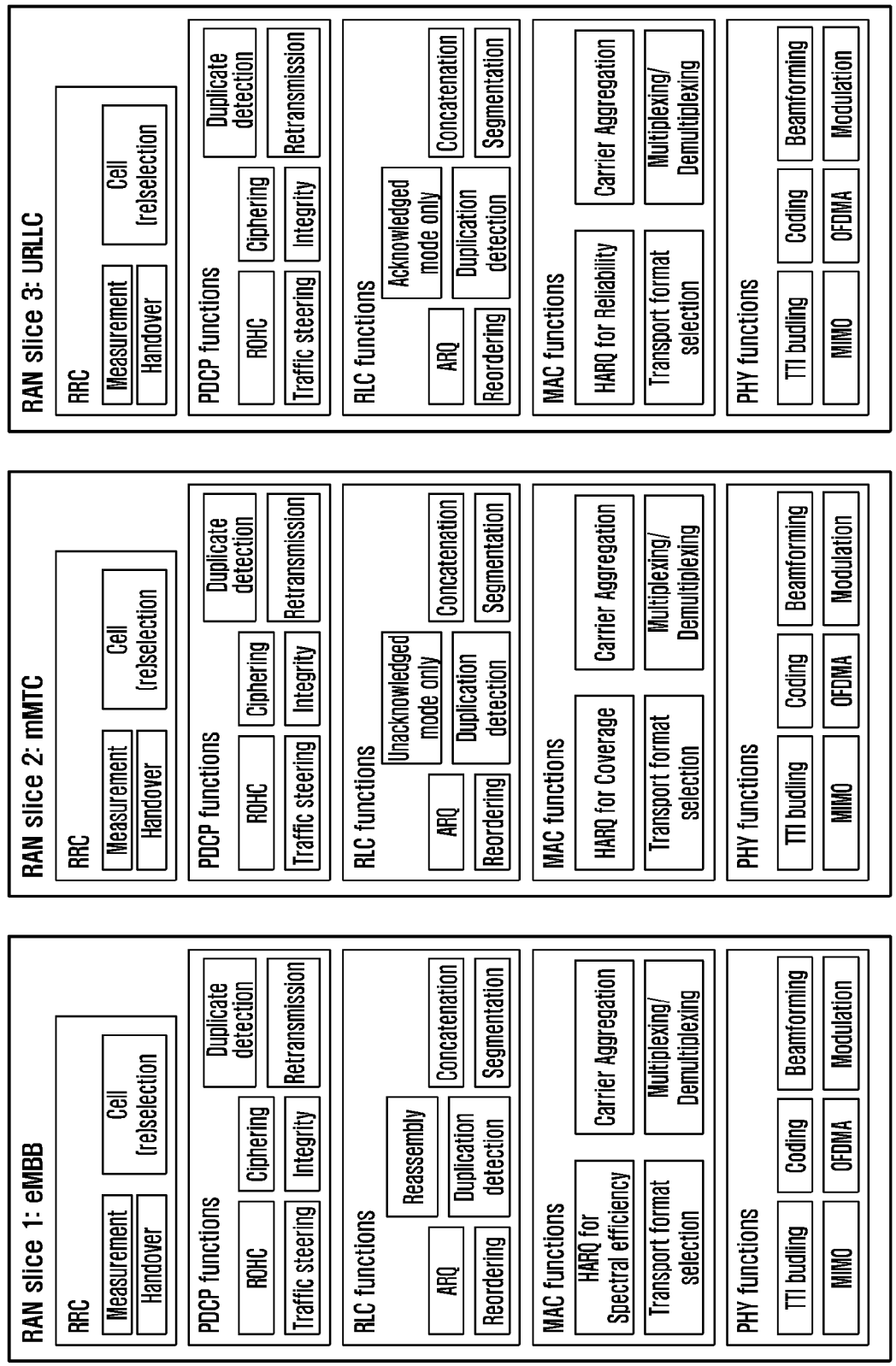
FIG. 22 is a diagram illustrating an example of RAN configuration per-service according to an embodiment of the disclosure.

FIG. 22 is a diagram illustrating an example of RAN configuration per-service according to an embodiment of the disclosure. FIG. 22 illustrates an example of the RAN slice having L1 and L2 configuration optimized for each of eMBB, mMTC and URLLC service.

An initial network attachment operation of a UE according to an embodiment of the disclosure may be performed in consideration of the following criteria.

1) Storage location of a wireless protocol (referred to as 'slice' for convenience) set based on service QoS 2) Presence or absence of prior knowledge of service type mainly provided (transmitted and received) by a UE Hereinafter, the initial network attachment operation of the UE considering the above criteria will be described.

A. If dedicated slice configuration per-service is stored in the UE and the eNB, the UE and the eNB may select and operate a slice suitable for a specific situation.

A.1. At this time, if there is no prior knowledge of the service type mainly provided by the UE, the slice may be selected (selected by the UE or selected according to a command of the eNB) according to the type of transmission/reception data generated after network registration. Next, the following procedure for establishing a wireless access and registering the UE in a network using a common slice between the UE and the eNB may be performed (an operation similar to that of the existing mobile communication system may be performed).

Receive sync signal and acquire cell ID

Receive broadcast information (PLMN/cell selection cell selection)

Random access

RRC connection establishment

Transmit and receive RRC signaling signal to and from SRB (e.g., authentication and security configuration-related message)

Thereafter, when transmission/reception data is generated in an RRC connected state, the following operation may be performed.

(In the case of uplink transmission) the UE transmits service information (RRC message or the like) to the eNB and receives a response.

(In the case of downlink transmission) the eNB transmits service information (RRC message or the like) to the UE, and receives a response User information may be transmitted and received with the selected service dedicated slice.

A.2. On the other hand, if there is the prior knowledge of the service type mainly provided by the UE, the UE notifies the eNB of the service type information when the UE performs the initial access procedure to be registered in the network, and the UE or the eNB may select the slice according to the service type of transmission/reception information generated thereafter. The following is an example of a method and operation in which the UE notifies the eNB/network of the service type information.

A.2.1. Operation of transmitting a part of RRC message to the eNB and the network Step 1: Perform the following operation using a common slice between the UE and the eNB.

Receive sync signal and acquire cell ID

Receive broadcast information (Plmn/cell selection)

Random access

RRC connection establishment

Step 2: The UE transmits information about the service type to the eNB. A means for transmitting the information may be an RRC message (e.g., RRC connection request, RRC connection setup complete, etc.), or a random access resource selection.

Step 3: The eNB transmits information regarding whether to support the corresponding service and slice selection indicating information to the UE. The information may include a method of transmitting the information in an RRC message, and may have the form as shown in the example of item of A.1.

Thereafter, the UE idle operation may be performed using a common slice or a dedicated slice, and the dedicated slice based on service information may be used at the time of CONNECTED.

A.2.2. Operation in which a UE selects a cell according to whether an eNB supports service Step 1: An RRC connection may be established as follows using a common slice between the UE and the eNB Receive sync signal and acquire cell ID Receive broadcast information (the eNB transmits whether to support a specific service as a part of broadcast information (SI), and may have the form as shown in the example of item of A.1.

Select plmn/cell supporting UE service based on SI content

Random access

RRC connection establishment

Thereafter, the UE idle operation may be performed using a common slice or a dedicated slice, and the dedicated slice based on service information may be used at the time of CONNECTED.

A subject of the slice selection may be the RRC layer of a UE or an eNB, or a slice management entity individually implemented in a transceiver.

B. A slice per-service may be set dynamically as needed.

Operation examples described below may be performed first by using a common slice in a network initial attachment of the UE.

Receive sync signal and acquire cell ID

Receive broadcast information (Plmn/cell selection cell selection

Random access

Transmit an RRC connection request message

B.1. At this time, where there is no prior knowledge of the service type mainly provided by the UE, the following operation may be performed.

B.1.1. Perform network registration using common configuration, and perform on-demand configuration according to the service type generated thereafter An RRC connection setup message may be received. At this time, the RRC connection setup message may include configuration of controlling a control channel observation operation of the UE in the connected state as a part of MAC configuration (SR configuration, BSR configuration, etc.) (start and end time of inactivity timer to start connected DRX operation, timer length, etc.). Meanwhile, uplink connection setup and downlink connection setup may be different from each other.

According to the content of the received RRC connection setup message, the SRB is established to enter the connected state.

An RRC connection setup complete message may be transmitted. At this time, the corresponding message may include an upper layer message (attachment request) and may be transmitted.

An RRC signaling signal may be transmitted and received (e.g., authentication and security configuration-related message).

If transmission/reception data for a specific service is generated in the RRC connection state, the service type of the corresponding data may be determined.

Meanwhile, uplink transmission information may be transmitted to corresponding service type eNB/network, and a detailed method thereof refers to an example described below.

The eNB and the network may set or select a slice based on the received service information and may notify the UE of the selected slice, and the corresponding method includes a method using an RRC message.

The UE may receive slice information through SRB configuration and may set a service dedicated slice. Next, user information may be transmitted and received.

Meanwhile, unlike the existing mobile communication system, an RRC connection reconfiguration operation may be performed only when transmission/reception data is generated.

B.1.2. Network registration may be performed using common configuration, information about the slice and service supported by the eNB may be received, and the UE may select the slice according to the service type generated thereafter.

The RRC connection setup message may be received. The SRB may be established according to the content of the received RRC connection setup message. Thereafter, the RRC connection setup complete message may be transmitted. At this time, the RRC connection setup complete message may include an upper layer message (e.g., attachment request).

The RRC signaling signal may be transmitted and received with the SRB (e.g., authentication and security configuration-related message).

Configuration information about all slices supported by the eNB may be transmitted to the UE. At this time, the configuration information may be transmitted as the RRC message (RRC connection reconfiguration or the like). The UE stores each piece of slice information.

Thereafter, if the generation of the transmission/reception data is detected, the UE may selectively use a dedicated slice for the corresponding service to perform a transmission/reception operation with the eNB.

B.2. If there is the prior knowledge of the service type mainly provided by the UE, the following operation may be performed.

An initial attachment procedure for the UE to be registered in the network is performed using a common slice, and at this time, the service type information may be notified to the eNB. A detailed operation for the UE to notify the eNB of the service type information may be similar to item of A.2 described above. Unlike the case in which operation of A.2 selects a predetermined slice, the UE or the eNB configures the slice for the generated transmission/reception information, as needed. A specific method in which the eNB or the UE sets a service dedicated slice and transmits information about the service dedicated slice may use various examples presented in other operations (RRC signal transmission/reception, etc.)

A signal transmitted/received between the UE and the eNB after the SRB is established may include a signaling message for network configuration other than the security authentication-related signal, and the detailed message and operation may be similar to those of the existing mobile communication system.

A method of transmitting the slice or transmission/reception service type information selected by the UE and the eNB may include the following methods.

1) Method of transmitting the slice or transmission/reception service type information as a part of the RRC message (IE)

If the eNB notifies the service type of downlink transmission information, service type information may be included in the paging message.

Example: transmit UE ID as a paging reception target and transmission/reception information service type together 2) Method of indicating the corresponding information as a scheduling request (SR) signal of the MAC 3) Method of indicating the corresponding information as a buffer status report (BSR)

4) Method of indicating the corresponding information as other MAC control element (CE) information 5) Method of transmitting the corresponding information using a specific resource location or signal of the physical layer 6) Method of transmitting the corresponding information as a part of scheduling information transmitted by the eNB 7) Method of indicating the corresponding information as an n-bit indicator indicating the slice/service selected by the UE or the eNB. See Table 8 below

TABLE 8

| index | Service type | Supported? |
|---|---|---|
| 0 | (Common slice or signaling, etc.) | |
| 1 | service type 1, e.g.eMBB | 1 |
| ... | ... | ... |
| n | service type n, e.g. mMTC | 0 |

(1 = supported, 0 = not supported)

In addition, some of the above methods and embodiments or modification thereof may be utilized.

Hereinafter, various embodiments of an operation in which the UE selects and uses the slice in the IDLE state will be described below.

The 'IDLE operation' used in the disclosure may include operations for transmitting/receiving a sync signal, transmitting/receiving broadcast information, selecting (re-selecting) a cell, and receiving a paging message, and a detailed operation thereof is similar to that of the conventional mobile communication system.

In addition, a 'connection operation for transiting from IDLE to CONNECTED state' described below may include an operation of establishing random access and RRC connection establishment for requesting a connection from the eNB after detecting the presence of the transmission/reception service, an operation of transmitting/receiving a security-related signal, and the like, and a detailed operation thereof may be similar to that of the conventional mobile communication system.

The following is an example of a slice selection operation of the UE in the IDLE state.

Method of selecting a common slice to perform an idle operation and using a dedicated slice at the time of wireless access establishment (idle to connected)

Step 1. The UE performs the idle operation using the common slice. That is, all UEs perform the idle operation using the same physical layer resource and operation configuration regardless of the transmission/reception information service type.

Step 2. Determine the service type of downlink reception waiting information when receiving a paging message.

Step 3. Perform a connection operation for transiting from IDLE to CONNECTED state using the service dedicated slice. That is, an operation of requesting a connection to the eNB is performed differently per-service.

Method of performing the idle operation and the operation for the connection to the eNB differently per-service by selecting the dedicated slice per-service Step 0. The eNB sets or selects the slice to be used by the UE in the IDLE.

The slice may be common slice configuration commonly applied to all UEs, or may be set as the service dedicated slice. In the latter case, the UE may determine the service type of information transmitted and received mainly by the UE in the connected state, and may set the slice based on the determination result. A detailed determination criterion may be service information stored in the UE/eNB, or an amount of information transmitted/received by the UE in the connected state per-service.

Step 1. The slice information is delivered/transmitted from the eNB to the UE.

The slice information may be transmitted as a part of the content of the RRC message (e.g., RRC release, suspend, reconfiguration, etc.).

Step 2. The idle operation is performed according to the slice information received by the UE.

Method of performing the idle operation based on the service dedicated slice used in a final connection state The slice may be a common or service dedicated slice.

If information having other requirements (or of another service type) is generated while performing the idle operation, the service type of the information may be transmitted to the eNB, and common configuration or service dedicated configuration may be used.

Meanwhile, the common slice operation and service dedicated operation of the UE in the idle state may include the following examples.

For example, as an embodiment of an operation for performing synchronization through the dedicated slice, the operation may include at least one of the following operations.

1) Sync signal transmission/reception may be performed differently per-slice.

2) A sync signal transmission/reception period, time and frequency resource location of a signal, a transmission/reception period, etc., may be controlled per-slice.

For example, as an embodiment of an operation of performing paging through the common slice, the operation may include at least one of the following operations.

1) If the purpose of call configuration is configuration of MT call through paging or configuration of MO call per-service, paging message transmission/reception may be performed through the common slice.

2) A narrowband channel for paging indication may be set or allocated. In a configuration method thereof, RRC message transmission to a plurality of UEs by the eNB, or static configuration may be used.

For example, as an embodiment of an operation of performing paging through the dedicated slice, the operation may include at least one of the following operations.

1) If the purpose of call configuration is configuration of MT call through paging or configuration of MO call per-service, paging message transmission/reception may be performed through the service dedicated slice, and an embodiment thereof may include the followings.

Set paging message scheduling period (DRX cycle) per-service

Example 1. In the case of a cell providing a specific service, different DRX cycle lengths are used in the cell.

Example 2. The UE adjusts a paging monitoring period (DRX cycle length) according to main services.

Determine based on transmission/reception service history, UE subscription information, etc.

In the case of a service with a high-level access latency requirement (that is, when rapid access is required), the paging monitoring period is set to be short.

In the case of a service with a low-level access latency requirement, the paging monitoring period is set to be long, i.e. check for paging less frequently Service-based control of paging frame (PF) or paging occasion (PO)

Offset is introduced to P0 according to DL access rate requirement per-service

Divide control channel (PDCCH) reception period (duration) of the UE per-service If a cell coverage in which a service mainly provided by the UE requests an extended cell coverage (e.g., in the case of mMTC), a PDCCH reception time and the like may be set to be long.

The eNB generates and transmits the paging message per-service

Set PCCH or PCH

Example 1. Introduce scheduling priority (preference)/order (sequence) according to the service to the PCCH or the PCH;

Example 2. Introduce service information to scheduling information about the PCH.

The UE may select or re-select a cell supporting a specific service, and may use paging reception configuration used in the corresponding cell. The paging reception configuration information includes a method of transmitting the cell as broadcast information (system information).

For example, as an embodiment of an operation of performing cell selection and re-selection through the dedicated slice, the operation may include the following operations.

The UE or the eNB may set a parameter for controlling a cell measurement operation per-service of transmission/reception information. For example, when the main service of the UE is mMTC, a method of setting a signal strength measurement period of a neighboring cell(s) to be long, and controlling the number of neighboring cells to be measured may be included (alternatively, the number of times of measurement may be set to be low). As a means for setting the above parameters, RRC signal transmission/reception can be used.

Meanwhile, a service dedicated slice operation at the time of a connection of the UE to the eNB (at the time of signal transmission/reception for transiting from IDLE to CONNECTED state) may include the following example.

For example, as an embodiment of an operation of performing random access through the dedicated slice, the operation may include at least one of the following operations.

1) If the purpose of call configuration is configuration of MT call through paging or configuration of MO call per-service, random access may be performed through the dedicated slice. The paging signal may include information about a service.

2) A time-frequency location of the PRACH resource may be divided per-service.

3) The number of times of random access attempt may be divided per-service.

4) A parameter (offset or the like) for setting random access transmission power, the maximum number of preamble retransmissions, a preamble retransmission time, etc., may be controlled according to a transmission/reception information service.

5) At this time, dedicated slice PRACH configuration information may determine PRACH resource information according to a configuration value which is acquired from the SIB received at the common slice or determined in advance.

6) Thereafter, a detailed PRACH procedure may be similar to the operation of the conventional mobile communication system.

For example, as an embodiment of an operation of performing RRC connection setup through the dedicated slice, the operation may include at least one of the following operations.

1) If the purpose of call configuration is configuration of MT call through paging or configuration of MO call per-service, RRC and lower layer operation configuration (logical channel transmission/reception configuration, or the like) may be performed through the dedicated slice. Transmission/reception configuration of the RRC connection setup message may include information about the service.

2) The UE or transmission data service information may be transmitted to an RRC message IE or a part of the IE.

3) UE common control channel (CCCH) information may be divided per-service. In the case of CCCH information for URLL, scheduling may be preferentially performed compared to CCCH for mMTC.

Hereinafter, various examples of operations in which the connected UE selects/sets and uses a slice will be described.

The UE connected to the eNB may set and control SRB1 and DRB per-service or per-requirement. One embodiment of the disclosure may include a method of setting a radio bearer (RB) based on service type information of transmission/reception information. Function and configuration of a lower layer such as PDCP, RLC, MAC, PHY, or the like may be set differently per-RB. For example, the UE may set the RB per-service type of the transmission/reception information, and may set PDCP and RLC operations corresponding to the RB.

Alternatively, the logical channel transmission/reception used by each of SRB1 and DRB may be set per-service or per-requirement. The logical channel may be a UE-specific control channel (DCCH) or a service-specific DCCH.

The following is an example of a transmission/reception operation for information/packet generated in an idle or connected state.

The UE may determine services and requirements. At this time, one or more requirements may be determined (e.g., error rate, delay time, transmission rate, etc.). If there is one or more requirements, each of the requirements can be prioritized (e.g., in the case of URLL service, a delay time and an error rate requirement may be prioritized).

In the case of a UE in an idle state, the procedure for connecting the UE to the eNB described above may be performed.

The eNB may set a radio bearer for information transmission/reception. At this time, the functions of each layer may be set dynamically to meet the requirements. An RRC connection request may include service information. Based on this information, the eNB may transmit service-based RAN configuration information (radio bearer configuration information, logical channel configuration information, PDCP, RLC, MAC, PHY layer configuration, etc.) to the RRC connection setup. Alternatively, the statically set RB may be selected by the UE and the eNB.

The following is an example of a service dedicated slice operation at the time of information transmission/reception of the connected UE.

An embodiment of an operation of performing the functions corresponding to the PDCP and RLC layer of a control plane and a user plane through the dedicated slice may include at least one of the following methods.

2) Method of controlling Integrity and ciphering, header compression for user plane transmission/reception information, RLC operation mode (whether to perform ARQ feedback), RLC ARQ operation (feedback transmission/reception conditions, timing, a feedback frequency, etc.), and segmentation and concatenation operations according to requirements 3) For example, when transmitting/receiving best effort (BE) service (ftp file transmission, e-mail, etc.) information, a wireless access control function corresponding to the RLC layer may be improved and used.

(E.g., when the BE service information is determined, the number of times of RLC PDU retransmission is set to a maximum value)

When the requirement level for a transmission delay time is high as in URLL, but a low error rate is required, the number of times of RLC PDU retransmission may be controlled to a maximum value or less.

An embodiment of an operation of performing the MAC function through the dedicated slice may include at least one of the following methods.

1) Multiplexing order per-logical channel, allocation size, and transport block size (TBS) may be controlled according to the transmission/reception service type.

2) Logical channel allocation and preference are assigned to each service, and the scheduling order may be controlled according to the transmission/reception service type according to the preference.

3) HARQ process assignment per-service: TTI length, feedback timing, feedback sequence, etc., may be controlled according to the transmission/reception service type.

4) Scheduling request (SR) transmission period, trigger condition, the number of SR transmissions, and whether to use sr-ProhibitTimer may be controlled according to the transmission/reception service type.

5) Buffer status report (BSR) transmission period, trigger condition, etc., may be controlled according to the transmission/reception service type.

6) Power headroom report (PHR) transmission period, trigger condition, etc., may be controlled according to the transmission/reception service type. Other MAC control element (CE) transmission period, trigger condition, etc., may be controlled according to the transmission/reception service type.

7) Inactivity timer starting and ending time starting connected DRX operation, timer length, etc., may be controlled according to the transmission/reception service type.

Hereinafter, a method of transmitting transmission/reception information having one or more service types in the connected state will be described.

In the case of uplink transmission, when a plurality of data packets are waiting for transmission in a UE storage device and one or more service types exist (different service type per-packet), at least one of the following operations may be performed.

1) RRC signaling RB between the UE and the eNB may be established through access operation.

2) When uplink/downlink data is generated, the service type may be determined. Whether the RB corresponding to a service is set for each packet may be determined.

3) It can be allocated (or linked) to different DRBs per-service/per-transmission/reception packet.

4) Priority may be set per-RB based on requirements per-service/per-transmission/reception packet, QoS, etc.

5) RB may be multiplexed (merged) based on RB having high requirement level

When information of another service type is generated in the UE which is connected to the eNB to use the service dedicated slice, at least one of the following operations may be performed.

1) When another service information (transmission/reception information with low QoS level compared to eMBB) is generated in the connected UE for eMBB information transmission/reception, the eNB and the UE may set a new RB or utilize the existing RB configuration. In this case, a criterion for determining whether the RB is set may be a service requirement of the newly generated information, determination of the degree of wasted wireless resources when the existing RB is utilized, and the like. For example, the control channel may be commonly used, and a data transmission channel such as PDSCH or PUSCH may be reset per-service.

2) Whether requirements (error rate, latency, coverage, etc.) of the newly generated information are satisfied as the currently established RB configuration may be determined.

3) Resources (power, time/frequency allocation resource, a delay time consumed for a HARQ/ARQ feedback frequency and wireless resources, the number of times of signaling transmission/reception, etc.) wasted when the existing RB configuration is used may be determined.

Hereinafter, various embodiments of a load control method for a wireless resource when a UE is connected to an eNB using a common slice will be described.

As an embodiment, a service access operation may be controlled by a common RRC message.

The operation of the UE according to the present embodiment is as follows.

The UE may assign/set priorities for each service type. When uplink transmission information is generated, services and requirements (delay time, error rate, etc.) may be determined. In addition, a random access operation may be set according to the priority of the corresponding service. Whether information to be transmitted to a buffer of a UE modem exists may be determined (or whether the access operation for transmitting and receiving information of another service type is being performed is determined). Here, when the UE is to perform the access operation or has already performed the access operation, information about all service types required to be transmitted and received may be transmitted together to eNB connection request message (e.g., RRC connection request).

The eNB operation according to the present embodiment is as follows.

The eNB may determine whether network access of the UE is performed based on the service type information transmitted by the UE, and may transmit a response message to the UE.

As an embodiment, the above operation may include a DL paging based backoff operation.

When the purpose of call configuration is an MT call, access time may be controlled based on the number of paging reception UEs.

For example, the UE may decrypt the received paging message to determine the number of paging UEs, and the UE may control a wireless access time based on this information. In addition, the wireless access attachment time may be controlled according to service requirements. The corresponding configuration may include backoff timer configuration proportional to the number of UEs, random backoff timer configuration in a specific range, and the like.

As an embodiment, a method (RACH exclusive configuration) of separately allocating random access resources per-service may be included.

The random access resources may include the control of a random access preamble, a location of a PRACH time-frequency resource, a parameter (offset or the like) for random access transmission power configuration, the maximum number of preamble retransmissions, and a preamble retransmission time. In addition, RACH power scaling may be applied according to the service priority.

Meanwhile, a device (UE, eNB, etc.) according to an embodiment of the disclosure may include a transceiver configured to transmit and receive signals, and a controller (e.g., a processor) configured to implement operations according to various embodiments of the disclosure.

At least some of the devices (e.g., modules or functions thereof) or methods (e.g., operations) according to various embodiments of the present disclosure may be implemented by, for example, by a command stored in a computer-readable storage medium in the form of a programming module. If the command is executed by one or more processors, the one or more processors may perform a function corresponding to the command. The computer-readable storage medium may be, for example, the memory. At least some of the programming modules may be implemented (for example, executed) by, for example, the processor. At least a part of the programming module may, for example, include a module, a program, a routine, a set of instructions, or a process for performing at least one function.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Furthermore, some operations may be executed in a different order or may be omitted, or other operations may be added.

Embodiments of the present disclosure provided in the present specifications and drawings are merely certain examples to readily describe the technology associated with embodiments of the present disclosure and to help understanding of the embodiments of the present disclosure, but may not limit the scope of the embodiments of the present disclosure. Therefore, in addition to the embodiments disclosed herein, the scope of the various embodiments of the present disclosure should be construed to include all modifications or modified forms drawn based on the technical idea of the various embodiments of the present disclosure.

The invention claimed is:

1. A method performed by a terminal in a wireless communication system, the method comprising:
   receiving, from a base station, a system information block (SIB) including configuration information on a first bandwidth part for an initial access, the configuration information including information on a first subcarrier spacing for a random access preamble and information on a random access resource;
   transmitting, to the base station, the random access preamble for the initial access using the first subcarrier spacing on the first bandwidth part, the first subcarrier spacing corresponding to the first bandwidth part;
   receiving, from the base station, a radio resource control (RRC) message including information for a second bandwidth part, the information for the second bandwidth part including information on a second subcarrier spacing corresponding to the second bandwidth part; and
   transmitting, to the base station, a preamble for a dedicated random access on the second bandwidth part using the second subcarrier spacing, wherein the dedicated random access is associated with a priority, wherein power scaling, a maximum transmission number of the preamble, and a backoff parameter applied for the dedicated random access associated with the priority are configured for the priority, and
   wherein the SIB further includes configuration information for a paging, and
   wherein a subcarrier spacing for monitoring a signal for the paging is the same as a subcarrier spacing for receiving the SIB.

2. The method of claim 1, wherein the information for the second bandwidth part is received by a physical downlink shared channel (PDSCH).

3. The method of claim 1, further comprising:
   monitoring the signal for the paging based on the configuration information for the paging, in case that the terminal is in an idle mode.

4. A terminal in a wireless communication system, the terminal comprising:
   a transceiver; and
   a controller configured to:
      control the transceiver to receive, from a base station, a system information block (SIB) including configuration information on a first bandwidth part for an initial access, the configuration information including information on a first subcarrier spacing for a random access preamble and information on a random access resource,
      control the transceiver to transmit, to the base station, the random access preamble for the initial access using the first subcarrier spacing on the first bandwidth part, the first subcarrier spacing corresponding to the first bandwidth part,
      control the transceiver to receive, from the base station, a radio resource control (RRC) message including information for a second bandwidth part, the information for the second bandwidth part including information on a second subcarrier spacing corresponding to the second bandwidth part, and
      control the transceiver to transmit, to the base station, a preamble for a dedicated random access on the second bandwidth part using the second subcarrier spacing, wherein the dedicated random access is associated with a priority, wherein power scaling, a maximum transmission number of the preamble, and a backoff parameter applied for the dedicated random access associated with the priority are configured for the priority,
   wherein the SIB further includes configuration information for a paging, and
   wherein a subcarrier spacing for monitoring a signal for the paging is the same as a subcarrier spacing for receiving the SIB.

5. The terminal of claim 4, wherein the information for the second bandwidth part is received by a physical downlink shared channel (PDSCH).

6. The terminal of claim 4,
wherein the controller is further configured to monitor the signal for the paging based on the configuration information for the paging, in case that the terminal is in an idle mode.

7. A method performed by a base station in a wireless communication system, the method comprising:
transmitting, to a terminal, a system information block (SIB) including configuration information on a first bandwidth part for an initial access, the configuration information including information on a first subcarrier spacing for a random access preamble and information on a random access resource;
receiving, from the terminal, the random access preamble for the initial access using the first subcarrier spacing on the first bandwidth part, the first subcarrier spacing corresponding to the first bandwidth part;
transmitting, to the terminal, a radio resource control (RRC) message including information for a second bandwidth part, the information for the second bandwidth part including information on a second subcarrier spacing corresponding to the second bandwidth part; and
receiving, from the terminal, a preamble for a dedicated random access on the second bandwidth part using the second subcarrier spacing, wherein the dedicated random access is associated with a priority, wherein power scaling, a maximum transmission number of the preamble, and a backoff parameter applied for the dedicated random access associated with the priority are configured for the priority,
wherein the SIB further includes configuration information for a paging, and
wherein a subcarrier spacing for monitoring a signal for the paging is the same as a subcarrier spacing for receiving the SIB.

8. The method of claim 7, wherein the information for the second bandwidth part is transmitted by a physical downlink shared channel (PDSCH).

9. The method of claim 7, further comprising:
transmitting, to the terminal, the signal for the paging based on the configuration information for the paging, in case that the terminal is in an idle mode.

10. A base station in a wireless communication system, the base station comprising:
a transceiver; and
a controller configured to:
control the transceiver to transmit, to a terminal, a system information block (SIB) including configuration information on a first bandwidth part for an initial access, the configuration information including information on a first subcarrier spacing for a random access preamble and information on a random access resource,
control the transceiver to receive, from the terminal, the random access preamble for the initial access using the first subcarrier spacing on the first bandwidth part, the first subcarrier spacing corresponding to the first bandwidth part,
control the transceiver to transmit, to the terminal, a radio resource control (RRC) message including information for a second bandwidth part, the information for the second bandwidth part including information on a second subcarrier spacing corresponding to the second bandwidth part, and
control the transceiver to receive, from the terminal, a preamble for a dedicated random access on the second bandwidth part using the second subcarrier spacing, wherein the dedicated random access is associated with a priority, wherein power scaling, a maximum transmission number of the preamble, and a backoff parameter applied for the dedicated random access associated with the priority are configured for the priority,
wherein the SIB further includes configuration information for a paging, and
wherein a subcarrier spacing for monitoring a signal for the paging is the same as a subcarrier spacing for receiving the SIB.

11. The base station of claim 10, wherein the information for the second bandwidth part is transmitted by a physical downlink shared channel (PDSCH).

12. The base station of claim 10,
wherein the controller is further configured to control the transceiver to transmit, to the terminal, the signal for the paging based on the configuration information for the paging, in case that the terminal is in an idle mode.

* * * * *